US009166679B2

(12) United States Patent
Shukunami

(10) Patent No.: US 9,166,679 B2
(45) Date of Patent: Oct. 20, 2015

(54) OPTICAL AMPLIFICATION APPARATUS, METHOD FOR CONTROLLING SAME, OPTICAL RECEIVER STATION, AND OPTICAL TRANSMISSION SYSTEM

(75) Inventor: Norifumi Shukunami, Yokohama (JP)

(73) Assignee: FUJITSU LIMITED, Kawasaki (JP)

(*) Notice: Subject to any disclaimer, the term of this patent is extended or adjusted under 35 U.S.C. 154(b) by 845 days.

(21) Appl. No.: 13/425,640

(22) Filed: Mar. 21, 2012

(65) Prior Publication Data

US 2012/0248287 A1 Oct. 4, 2012

(30) Foreign Application Priority Data

Apr. 4, 2011 (JP) .................................. 2011-082515

(51) Int. Cl.
| | |
|---|---|
| G01J 1/32 | (2006.01) |
| H04B 10/032 | (2013.01) |
| H04B 10/079 | (2013.01) |
| H04B 10/293 | (2013.01) |
| H04J 14/02 | (2006.01) |

(52) U.S. Cl.
CPC .......... *H04B 10/032* (2013.01); *H04B 10/0797* (2013.01); *H04B 10/2937* (2013.01); *H04J 14/0294* (2013.01); *H04J 14/0295* (2013.01)

(58) Field of Classification Search
CPC ............. H04B 10/0797; H04B 10/079; H04B 10/075; H04B 10/2933; H04B 10/293; H04B 10/291; H04B 10/29; H04B 10/297; H04B 10/2971; H04B 10/032; H04B 10/03; H04B 10/2937; H04J 14/0297; H04J 14/0295; H04J 14/0294; H04J 14/0293; H04J 14/0287; H01S 3/06787; H01S 3/06754; H01S 3/067
See application file for complete search history.

(56) References Cited

U.S. PATENT DOCUMENTS

| | | | | |
|---|---|---|---|---|
| 5,299,048 A | * | 3/1994 | Suyama | 398/181 |
| 5,812,710 A | * | 9/1998 | Sugaya | 385/27 |
| 6,101,025 A | | 8/2000 | Naganuma | |
| 6,181,467 B1 | * | 1/2001 | Jung et al. | 359/341.31 |
| 6,212,000 B1 | * | 4/2001 | Ishikawa | 359/341.1 |
| 6,278,536 B1 | * | 8/2001 | Kai et al. | 398/79 |
| 6,496,305 B2 | * | 12/2002 | Spock et al. | 359/349 |

(Continued)

FOREIGN PATENT DOCUMENTS

| | | |
|---|---|---|
| JP | 9-5806 | 1/1997 |
| JP | 9-93201 | 4/1997 |

(Continued)

OTHER PUBLICATIONS

Japanese Office Action issued Oct. 21, 2014 in corresponding Japanese Patent Application No. 2011-082515.

*Primary Examiner* — John Lee
(74) *Attorney, Agent, or Firm* — Staas & Halsey LLP

(57) ABSTRACT

An optical amplification apparatus includes an optical amplification medium configured to receive a first light signal from an end of the optical amplification medium and a second light signal from the other end of the optical amplification medium in opposite directions, the first and second light signals being branched from a light signal, an excitation light source configured to supply excitation light to the optical amplification medium through a multiplexer, a monitor configured to monitor the first and second light signals input to the optical amplification medium, respectively and to output monitoring signals respectively, and a controller configured to control the excitation light source in accordance with the monitoring signals.

17 Claims, 22 Drawing Sheets

(56) References Cited

U.S. PATENT DOCUMENTS

| | | | |
|---|---|---|---|
| 6,616,351 B1* | 9/2003 | Jang | 398/94 |
| 6,888,671 B2* | 5/2005 | Joo et al. | 359/341.2 |
| 6,941,074 B2* | 9/2005 | Nakamura et al. | 398/92 |
| 7,269,349 B2* | 9/2007 | Kinjo et al. | 398/27 |
| 7,537,395 B2* | 5/2009 | Savage-Leuchs | 385/92 |
| RE41,438 E* | 7/2010 | Hall et al. | 385/142 |
| 8,676,054 B2* | 3/2014 | Suzuki et al. | 398/45 |
| 2001/0048545 A1 | 12/2001 | Shimojoh | |
| 2002/0024699 A1* | 2/2002 | Tomooka et al. | 359/134 |
| 2002/0041435 A1* | 4/2002 | Krummrich | 359/337.4 |
| 2002/0101633 A1* | 8/2002 | Onaka et al. | 359/119 |
| 2002/0141048 A1* | 10/2002 | Spock et al. | 359/349 |
| 2002/0181078 A1* | 12/2002 | Tanaka et al. | 359/334 |
| 2003/0077030 A1* | 4/2003 | Oberg et al. | 385/24 |
| 2003/0185562 A1* | 10/2003 | Feinberg et al. | 398/5 |
| 2003/0231376 A1* | 12/2003 | Horachi et al. | 359/333 |
| 2004/0032642 A1* | 2/2004 | Imai et al. | 359/334 |
| 2004/0151499 A1* | 8/2004 | Ibukuro et al. | 398/45 |
| 2005/0179989 A1* | 8/2005 | Osaka | 359/334 |
| 2005/0226550 A1* | 10/2005 | Miyata et al. | 385/16 |
| 2006/0152796 A1* | 7/2006 | Hayashi et al. | 359/334 |
| 2006/0291036 A1* | 12/2006 | Shukunami et al. | 359/333 |
| 2008/0013162 A1* | 1/2008 | Shukunami et al. | 359/334 |
| 2008/0063150 A1* | 3/2008 | Kanaan et al. | 379/26.01 |
| 2008/0219300 A1* | 9/2008 | Krupkin et al. | 372/6 |
| 2008/0316591 A1* | 12/2008 | Tsuzuki et al. | 359/337.1 |
| 2009/0237778 A1* | 9/2009 | Onaka | 359/334 |
| 2009/0257115 A1* | 10/2009 | Komaki et al. | 359/337 |
| 2010/0142945 A1* | 6/2010 | Shukunami et al. | 398/28 |
| 2010/0272445 A1* | 10/2010 | Inagaki et al. | 398/160 |
| 2011/0058821 A1* | 3/2011 | Goto | 398/195 |
| 2011/0063721 A1 | 3/2011 | Takeyama | |
| 2011/0317995 A1* | 12/2011 | Zheng | 398/2 |
| 2012/0006977 A1* | 1/2012 | Shukunami et al. | 250/214 LA |
| 2012/0248287 A1* | 10/2012 | Shukunami | 250/205 |

FOREIGN PATENT DOCUMENTS

| | | |
|---|---|---|
| JP | 2001-203644 | 7/2001 |
| JP | 2003-207617 | 7/2003 |
| JP | 2005-80108 | 3/2005 |
| JP | 2007-282277 | 10/2007 |
| JP | 2009-272570 | 11/2009 |
| JP | 2011-66142 | 3/2011 |

\* cited by examiner

OPTICAL AMPLIFICATION APPARATUS, METHOD FOR CONTROLLING SAME, OPTICAL RECEIVER STATION, AND OPTICAL TRANSMISSION SYSTEM

CROSS-REFERENCE TO RELATED APPLICATION

This application is based upon and claims the benefit of priority of the prior Japanese Patent Application No. 2011-082515, filed on Apr. 4, 2011, the entire contents of which are incorporated herein by reference.

FIELD

The embodiment discussed herein is related to an optical amplification apparatus, a method for controlling the optical amplification apparatus, an optical receiver station, and an optical transmission system.

BACKGROUND

In accordance with increasing demand for communication caused by the spread of the Internet and the like, a wavelength-division multiplexing (WDM) system utilizing the wide band of an optical amplifier is being developed.

Furthermore, in these years, a reconfigurable optical add-drop multiplexer (ROADM) system to be used in combination with the WDM system and a wavelength routing technique is being introduced into a metro ring network.

In addition, because demand for communicating audio data and a larger amount of image data is also increasing in accordance with the spread of fiber-to-the-home (FTTH) and the like, the communication rate per wavelength in a WDM system is increasing from approximately 10 Gbps to 40 Gbps, and even to approximately 100 Gbps.

In such an optical transmission system that communicates a large amount of data, a redundant configuration may be adopted in which light signals are transmitted using a plurality of transmission paths such as a work line and a protection line and received while switching the line in accordance with occurrence of failures, in order to improve the reliability during the occurrence of failures.

In an optical transmission system having a single ring network, for example, an optical protection architecture such as an optical unidirectional path-switched ring (OUPSR) or an optical shared path protection ring (OSPPR) is adopted.

FIG. 1 illustrates an example of the optical transmission system. In an optical transmission system 100 illustrated in FIG. 1, an optical transmitter station 200 divides a light signal generated with an optical transmitter 201 using an optical coupler 202, and outputs the divided light signal to a work line 401 and a protection line 402.

On the other hand, an optical receiver station 300 switches the connection thereof between the work line 401 and the protection line 402 using an optical switch (optical SW) 301 in accordance with occurrence of failures in the lines and the quality of communication, and receives a light signal. After amplifying the received light signal with an optical amplifier 302, the optical receiver station 300 extracts data from the light signal with an optical receiver 303. For example, as illustrated in FIG. 1, if a failure such as a disconnection of an optical fiber occurs in the work line 401, the optical receiver station 300 switches the connection thereof to the protection line 402 with the optical SW 301, and receives a light signal through the protection line 402.

FIG. 2 illustrates another example of the optical transmission system. An optical transmission system 101 illustrated in FIG. 2 is different from the optical transmission system 100 illustrated in FIG. 1 in that optical relays 501 and 502 are included in the work line 401 and the protection line 402, respectively. The other components 200, 201, 202, 300, 301, 302, and 303 are the same as those of the optical transmission system 100 illustrated in FIG. 1.

In the optical transmission system 101, too, if a failure such as a disconnection of an optical fiber occurs in the work line 401, the optical receiver station 300 switches the connection thereof to the protection line 402 using the optical SW 301, and receives a light signal through the protection line 402.

FIG. 3 illustrates an example of the WDM system. A WDM system 102 illustrated in FIG. 3, an optical transmitter station 200' divides light signals generated with optical transmitters 201'-1 to 201'-n ("n" is an integer equal to or larger than 2) using optical couplers 202'-1 to 202'-n. The optical transmitter station 200' then inputs the divided light signals to WDM couplers 203-1 and 203-2 to generate a plurality of wavelength-multiplexed light signals, and outputs the light signals to the work line 401 and the protection line 402.

A wavelength-multiplexed light signal transmitted through the work line 401 is amplified and relayed to the optical receiver station 300' by a WDM optical relay 501'. A wavelength-multiplexed light signal transmitted through the protection line 402 is amplified and relayed to the optical receiver station 300' by a WDM optical relay 502'.

On the other hand, the optical receiver station 300' divides light signals having a plurality of wavelengths included in the wavelength-multiplexed light signals in units of wavelengths using WDM couplers 304-1 and 304-2.

Next, the optical receiver station 300' switches the connection thereof between the work line 401 and the protection line 402 using optical SWs 301'-1 to 301'-n in accordance with occurrence of failures in the lines, and receives the divided light signals. For example, as illustrated in FIG. 3, if a failure such as a disconnection of an optical fiber occurs in the work line 401, the optical receiver station 300' switches the connection thereof to the protection line 402 using the optical SWs 301'-1 to 301'-n, and receives light signals through the protection line 402.

The optical receiver station 300' then amplifies the received light signals with optical amplifiers 302'-1 to 302'-n and extracts data from the light signals with optical receivers 303'-1 to 303'-n.

FIG. 4 illustrates an example of the OADM system.

In an OADM system 103 illustrated in FIG. 4, an OADM node 600-1 divides light signals generated with optical transmitters (Tx's) 601-1 to 601-n using splitters (BSs) 602-1 to 602-n.

The OADM node 600-1 inputs the divided light signals to WDM couplers 603-1 and 603-2 to generate a plurality of wavelength-multiplexed light signals.

A wavelength selection switch (WSS) 611 selects a desired wavelength of the wavelength-multiplexed light signal generated by the WDM coupler 603-1. The wavelength-multiplexed light signal is then amplified by an optical amplifier 612 and added to a work line 401-1. On the other hand, a WSS 617 selects a desired wavelength of the wavelength-multiplexed light signal generated by the WDM coupler 603-2. The wavelength-multiplexed light signal is then amplified by an optical amplifier 618 and added to a protection line 402-1.

As with the OADM node 600-1, OADM nodes 600-2, 600-3, and 600-4 have the configurations and the functions for transmission. For example, the OADM nodes 600-2, 600-3, and 600-4 may add light signals having desired wavelengths to work lines 401-2, 401-3, and 401-4 and protection lines 402-4, 402-3, and 402-2, respectively. Tx's 619-1 to 619-n, BSs 620-1 to 620-n, WDM couplers 621-1 and 621-2, WSSs 629 and 635, and optical amplifiers 630 and 636 of the OADM node 600-3 have the same functions as the Tx's 601-1 to 601-n, the BSs 602-1 to 602-n, the WDM couplers 603-1 and 603-2, the WSSs 611 and 617, and the optical amplifiers 612 and 618, respectively, of the OADM node 600-1.

On the other hand, the OADM node 600-1 amplifies a light signal received through the work line 401-4 using optical amplifiers 607 and 609 and compensates or mitigates the amount of chromatic dispersion using a dispersion compensator 608. The OADM node 600-1 then divides the light signal with the BS 610 and outputs the divided light signal to the WSS 611 and a WDM 606-1. The OADM node 600-1 also amplifies a light signal received through the protection line 402-4 using optical amplifiers 613 and 615 and mitigates the amount of the chromatic dispersion using a dispersion compensator 614. The OADM node 600-1 then divides (drops) the light signal with a BS 616 and outputs the divided light signal to the WSS 617 and a WDM 606-2.

Next, the OADM node 600-1 divides light signals included in the wavelength-multiplexed light signals in units of wavelengths using the WDM couplers 606-1 and 606-2 and outputs the divided light signals to optical SWs 605-1 to 605-n.

The OADM node 600-1 then switches the connection thereof between the work line 401-4 and the protection line 402-4 using the optical SWs 605-1 to 605-n in accordance with occurrence of failures in the lines, and receives the light signals. Optical receivers (Rx's) 604-1 to 604-n extract data from the light signals.

For example, as illustrated in FIG. 4, if a failure such as a disconnection of an optical fiber occurs in the work line 401-4, the OADM node 600-1 switches the connection thereof to the protection line 402-4 using the optical SWs 605-1 to 605-n, and receives light signals through the protection line 402-4.

As with the OADM node 600-1, the OADM nodes 600-2, 600-3, and 600-4 have the configurations and the functions for reception. For example, the OADM nodes 600-2, 600-3, and 600-4 may drop light signals received through the work lines 401-1, 401-2, and 401-3 and the protection lines 402-3, 402-2, and 402-1, respectively. Rx's 622-1 to 622-n, optical SWs 623-1 to 623-n, WDM couplers 624-1 and 624-2, BSs 628 and 634, optical amplifiers 625, 627, 631, and 633, and dispersion compensators 626 and 632 of the OADM node 600-3 have the same functions as the Rx's 604-1 to 604-n, the optical SWs 605-1 to 605-n, the WDM couplers 606-1 and 606-2, the BSs 610 and 616, the optical amplifiers 607, 609, 613, and 618, and the dispersion compensators 608 and 614, respectively, of the OADM node 600-1.

In an optical receiver station of an optical transmission system, optical components whose optical losses are relatively large, such as an optical coupler and a WDM coupler adopting an arrayed waveguide grating (AWG), are used on a reception port side. In addition, in order to accommodate the increasing transmission rate of optical transmission systems, optical receivers have higher optical input levels. Therefore, an optical receiver station may include an optical amplifier that amplifies a received light signal.

FIG. 5 illustrates an example of the configuration of an optical receiver station used in a WDM system.

As illustrated in FIG. 5, an optical receiver station 300" divides light signals included in wavelength-multiplexed light signals transmitted through a work line 401 and a protection line 402 in units of wavelengths using WDM couplers 304-1 and 304-2. Each wavelength-multiplexed light signal includes light signals having a plurality of wavelengths, and data has been superimposed upon each light signal by an optical transmitter station. From among the light signals divided using the WDM couplers 304-1 and 304-2, for example, light signals having a wavelength λ1 are input to BSs 305 and 306. Components light signals having other wavelengths are not illustrated in order to simplify the description.

The BS 305 divides a light signal input from the WDM coupler 304-1 and outputs the divided light signal to a photodetector (PD) 307 and an optical SW 301". On the other hand, the BS 306 divides a light signal input from the WDM coupler 304-2 and outputs the divided light signal to a PD 308 and the optical SW 301".

The PDs 307 and 308 judge whether the levels of the input light signals are equal to or higher than a threshold value, and notify the optical SW 301" of results of the judgments. The optical SW 301" detects occurrence of failures in the work line 401 and the protection line 402 on the basis of the results of the judgments made by the PDs 307 and 308, and switches, on the basis of detected failures, a source from which the optical SW 301" receives light signals to connect the source to an optical receiver 302".

For example, as illustrated in FIG. 5, if a failure such as a disconnection of an optical fiber occurs in the work line 401-4, the PD 307 judges that the level of an input light signal is lower than the threshold value and the optical SW 301" detects occurrence of a failure in the work line 401 on the basis of the result of the judgment. The optical SW 301" switches a path connected to the optical amplifier 302" from the work line 401 to the protection line 402, and receives light signals through the protection line 402. Time taken until the optical SW 301" completes the switching after occurrence of a failure is about 50 ms in most cases.

The optical amplifier 302" amplifies a light signal from the optical SW 301" and inputs the light signal to an optical receiver 303". The optical receiver 303" extracts data from the light signal amplified by the optical amplifier 302".

At this time, the optical amplifier 302" might be subjected to automatic level control (ALC) in order to cause the output level of the light signal after the amplification to be uniform. The control period of the ALC is, for example, about 1 kHz (about 1 ms) in most cases.

In this case, if a disconnection occurs in the work line 401, the optical SW 301" switches the connection to the protection line 402, but no light signal is input to the optical amplifier 302" (no-input state) after the occurrence of the disconnection until completion of the switching of the path.

When the optical amplifier 302" enters the no-input state under the ALC, amplification gain is controlled such that the input level, which is close to zero at this moment, is amplified to a given output level, and therefore the amplification gain rises sharply. As a result, when transmission of light signals through the protection line 402 recovers upon the completion of the switching of the path performed by the optical SW 301", an optical surge occurs in the optical amplifier 302".

The optical surge in the optical amplifier 302" may damage the optical receiver 303". Furthermore, because of the occurrence of the optical surge, the optical receiver station 300" might not be able to reproduce light signals.

SUMMARY

According to an aspect of the invention, an apparatus includes an optical amplification medium configured to receive a first light signal from an end of the optical amplification medium and a second light signal from the other end of the optical amplification medium in opposite directions, the first and second light signals being branched from a light signal, an excitation light source configured to supply excitation light to the optical amplification medium through a multiplexer, a monitor configured to monitor the first and second light signals input to the optical amplification medium, respectively and to output monitoring signals respectively, and a controller configured to control the excitation light source in accordance with the monitoring signals.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

An embodiment will be described hereinafter with reference to the drawings. The embodiment that will be described hereinafter is merely an example, and not intended to exclude application of various modifications and techniques that are not specified in the embodiment and modifications that will be described hereinafter. That is, the embodiment and the modifications may be altered in various ways without deviating from the scope of the embodiment.

Figure 1:
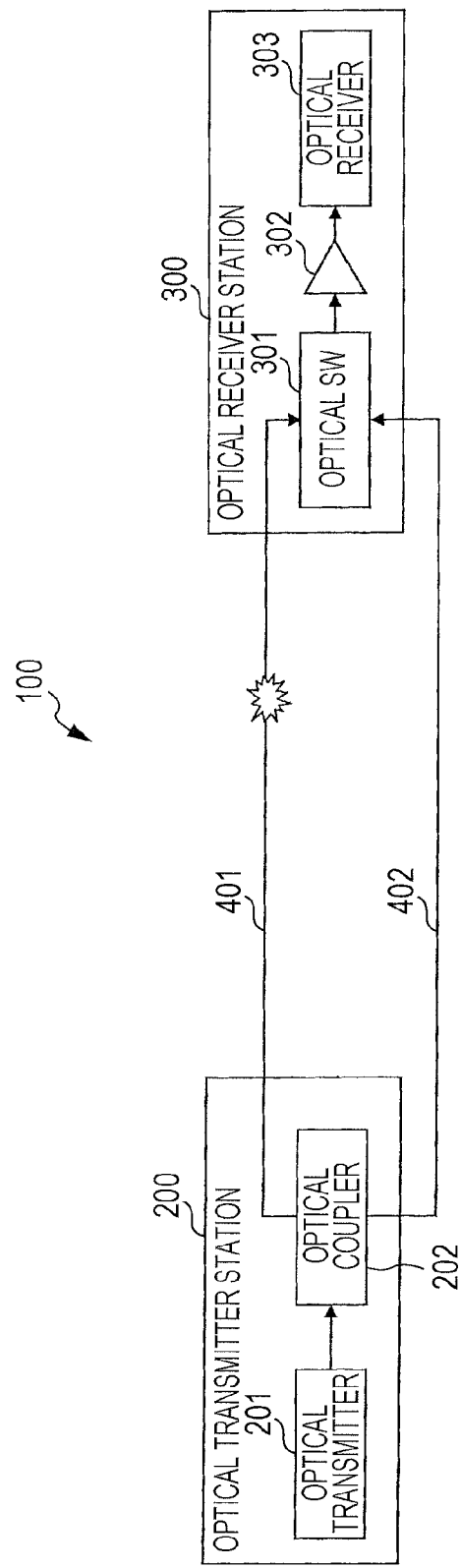
FIG. 1 illustrates an example of an optical transmission system.
Figure 2:
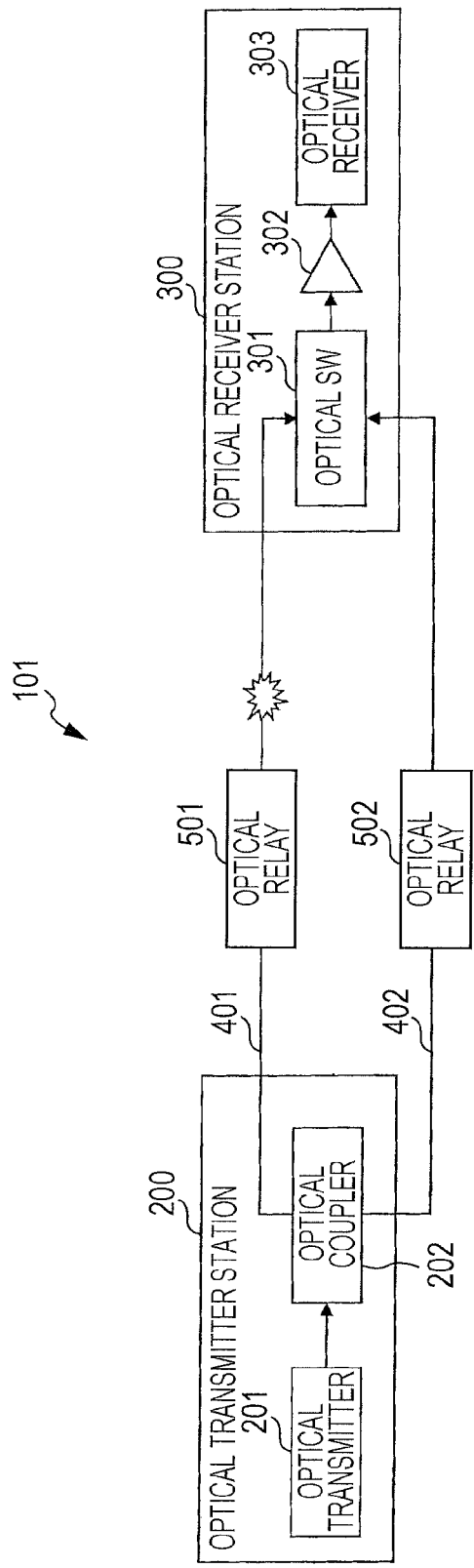
FIG. 2 illustrates another example of the optical transmission system.
Figure 3:
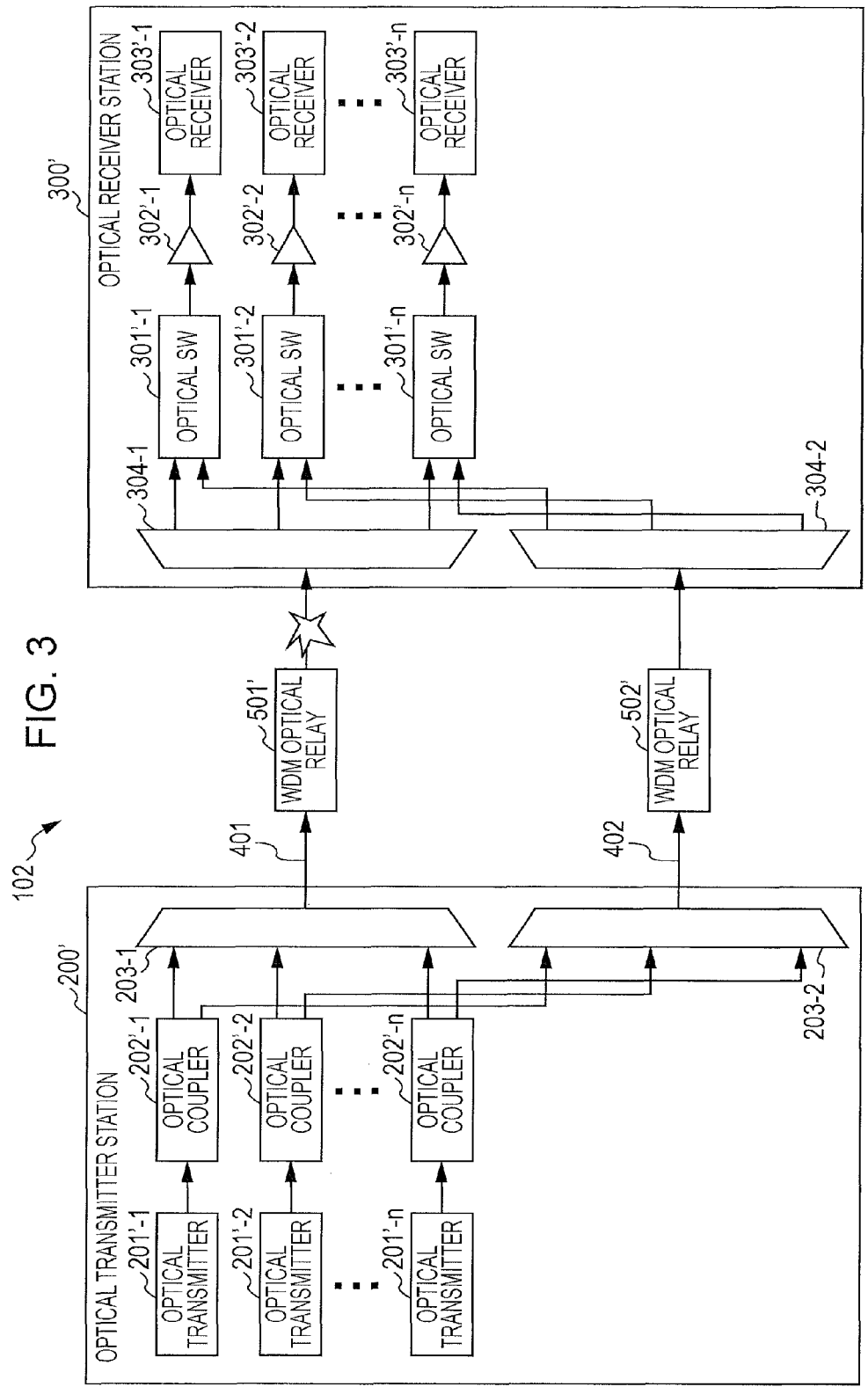
FIG. 3 illustrates an example of a WDM system.
Figure 4:
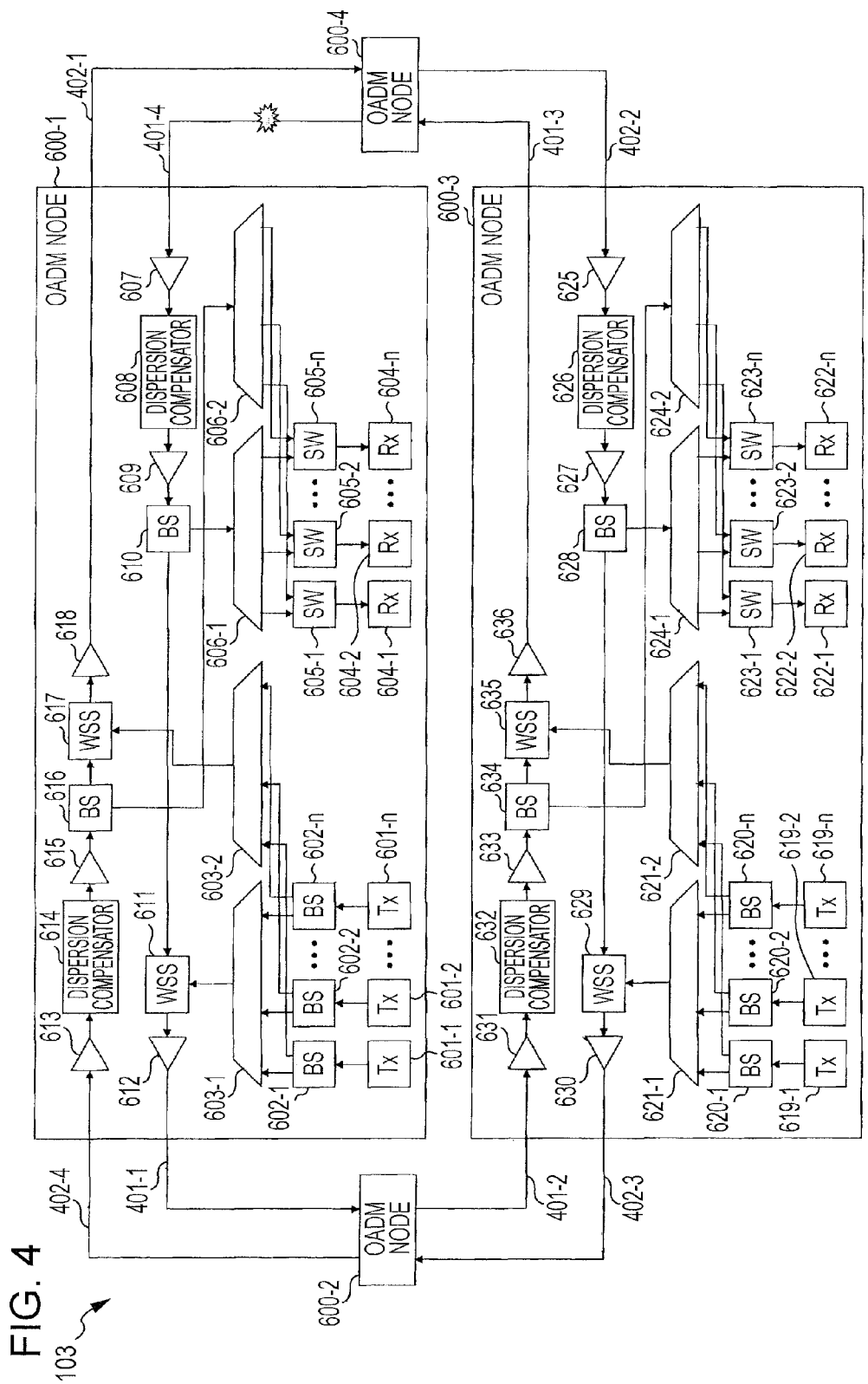
FIG. 4 illustrates an example of an OADM system.
Figure 5:
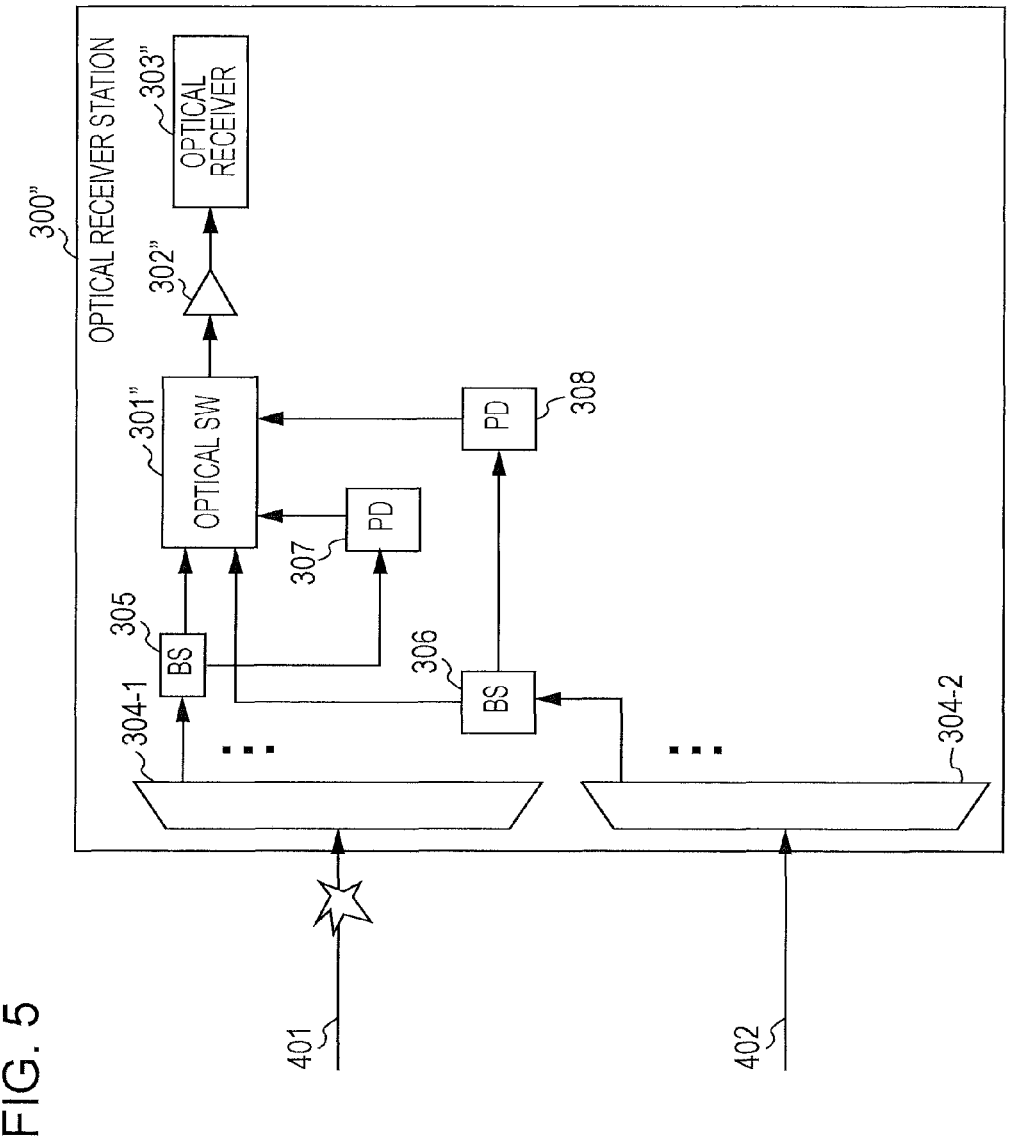
FIG. 5 illustrates an example of the configuration of an optical receiver station.
Figure 6:
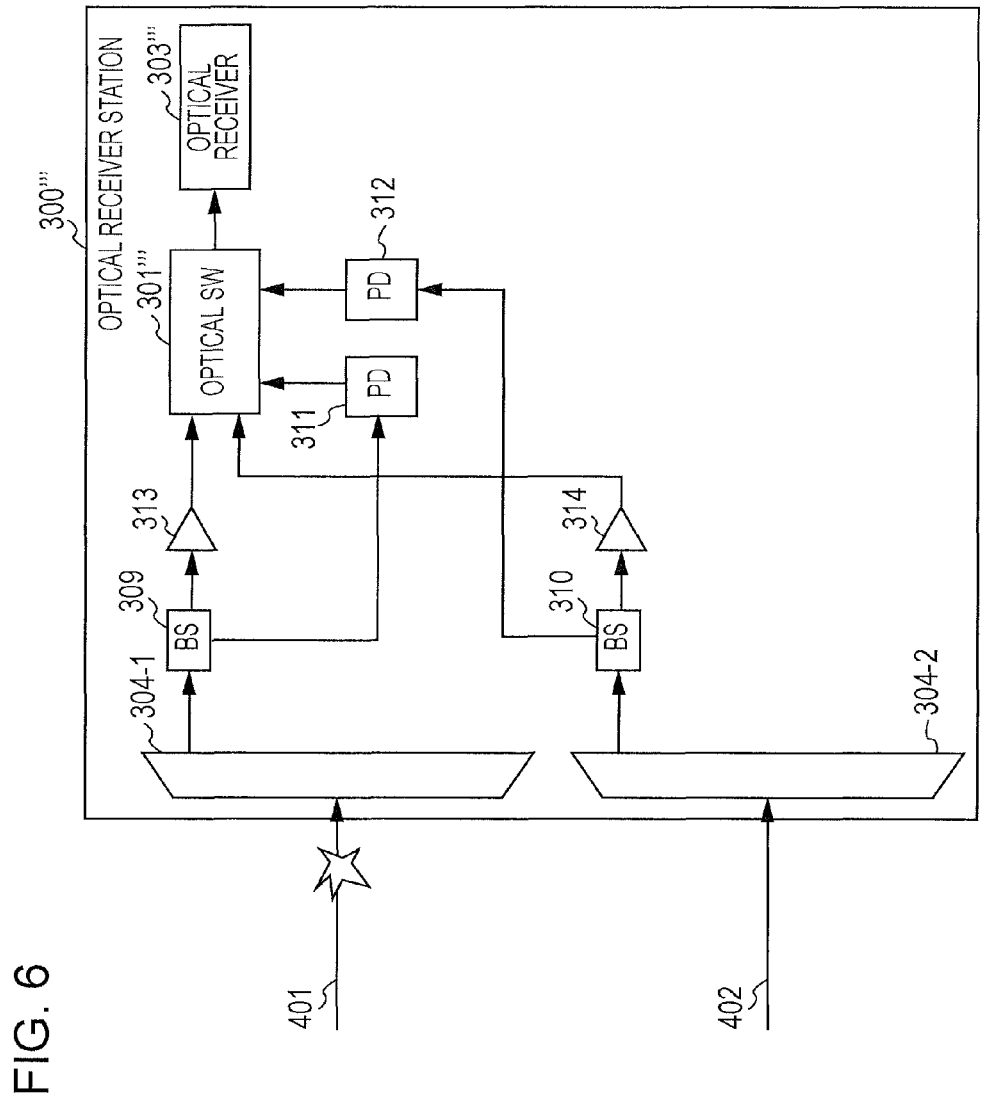
FIG. 6 illustrates another example of the configuration of an optical receiver station.

[1] Example of Configuration of Optical Receiver Station Obtained in Course of Creating Present Embodiment FIG. 6 illustrates an example of the configuration of an optical receiver station. In an optical receiver station 300''' illustrated in FIG. 6, WDM couplers 304-1 and 304-2 divide, in units of wavelengths, light signals included in wavelength-multiplexed light signals transmitted through a work line 401 and a protection line 402. Light signals having a plurality of wavelengths are included in each wavelength-multiplexed light signal, and data has been superimposed upon each light signal by an optical transmitter station. From among the light signals divided by the WDM couplers 304-1 and 304-2, for example, light signals having a wavelength λ1 are input to BSs 309 and 310. Components relating to light signals having other wavelengths are not illustrated in order to simplify the description.

The BS 309 divides a light signal input from the WDM coupler 304-1, and outputs the divided light signal to a PD 311 and an optical amplifier 313. The BS 310 divides a light signal input from the WDM coupler 304-2, and outputs the divided light signal to a PD 312 and an optical amplifier 314.

The optical amplifiers 313 and 314 amplify the light signals divided by the BSs 309 and 310. The optical amplifiers 313 and 314 may be subjected to ALC in order to make the output levels of amplified light signals uniform.

The PD 311 judges whether or not the level of an input light signal is equal to or higher than a first threshold value, and notifies an optical SW 301''' of a result of the judgment. On the other hand, the PD 312 judges whether or not the level of an input light signal is equal to or higher than a second threshold value, and notifies the optical SW 301''' of a result of the judgment. The first and second threshold values may be the same or may be different.

The optical SW 301''' detects occurrence of failures in the work line 401 and the protection line 402 on the basis of the results of the judgments made by the PDs 309 and 310, respectively. The optical SW 301''' then switches, on the basis of detected failures, a source from which the optical SW 301''' receives light signals, and connects the source to an optical receiver 303'''.

For example, as illustrated in FIG. 6, if a failure such as a disconnection of an optical fiber occurs in the work line 401, the PD 311 judges that the level of an input light signal is lower than the first threshold value, and the optical SW 301''' detects the occurrence of the failure in the work line 401 on the basis of the result of the judgment. The optical SW 301''' then switches a path connected to the optical receiver 303''' from the work line 401 to the protection line 402, and receives light signals from the protection line 402.

A light signal that has been selectively output from the optical SW 301''' is input to the optical receiver 303''', which then extracts data from the input light signal.

Thus, the optical receiver station 300''' illustrated in FIG. 6 has the optical amplifier 313 that amplifies a light signal received through the work line 401 and the optical amplifier 314 that amplifies a light signal received through the protection line 402 in a previous stage of the optical SW 301'''.

Therefore, even if a disconnection has occurred in a line while the optical amplifiers 313 and 314 are under the ALC, effects of an optical surge may be suppressed.

In the optical receiver station 300''' having the configuration illustrated in FIG. 6, however, the number of optical amplifiers included are large, thereby increasing the size and the manufacturing cost of the apparatus.

[2] Embodiment (1.1) Example of Configuration of Optical Transmission System

Figure 7:
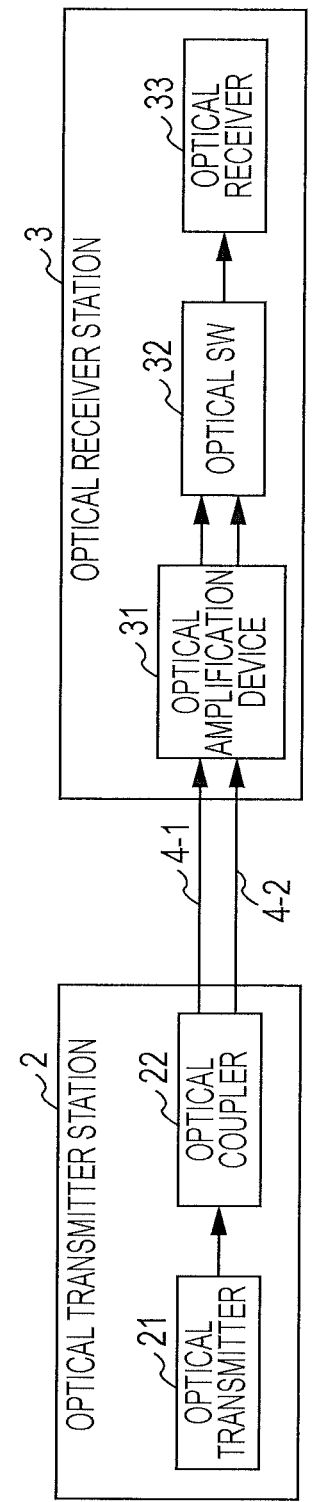
FIG. 7 illustrates an example of the configuration of an optical transmission system according to an embodiment.

FIG. 7 illustrates an example of the configuration of an optical transmission system according to an embodiment.

An optical transmission system 1 illustrated in FIG. 7 has, for example, an optical transmitter station 2 and an optical receiver station 3.

The optical transmitter station 2 transmits a first light signal (hereinafter also referred to as a "work light signal") through a first optical transmission path (hereinafter also referred to as a "work line") 4-1 and a second light signal (hereinafter also referred to as a "protection light signal") through a second optical transmission path (hereinafter also referred to as a "protection line") 4-2. Therefore, the optical transmitter station 2 has an optical transmitter 21 and an optical coupler 22. Data superimposed upon a work light signal and data superimposed upon a protection light signal in the optical transmitter station 2 are the same, and the optical transmission system 1 is configured to be redundant by the work line 4-1 and the protection line 4-2. The number of work lines 4-1 and protection lines 4-2 are not limited to that illustrated in FIG. 7 as an example. The work line 4-1 and the protection line 4-2 may be a plurality of optical transmission paths.

The optical transmitter 21 generates a light signal by modulating the amplitude or the phase of light that serves as a carrier with data to be transmitted. The light signal generated by the optical transmitter 21 is output to the optical coupler 22.

The optical coupler 22 divides the light signal output from the optical transmitter 21 into a work light signal and a protection light signal, and outputs the work light signal to the work line 4-1 and the protection light signal to the protection line 4-2 that is available even if the work line 4-1 fails.

The work light signal and the protection light signal transmitted from the optical transmitter station 2 propagate through the work line 4-1 and the protection line 4-2, respectively, and reach the optical receiver station 3.

On the other hand, the optical receiver station 3 may receive the work light signal and the protection light signal transmitted from the optical transmitter station 2. Therefore, the optical receiver station 3 has an optical amplification device 31 as an optical amplification apparatus, an optical switch (optical SW) 32, and an optical receiver 33.

The optical amplification device 31 amplifies the work light signal input through the work line 4-1 to one input port (first input port) of the optical amplification device 31 and the protection light signal input through the protection line 4-2 to another input port (second input port) of the optical amplification device 31. When amplifying each light signal, the optical amplification device 31 performs the ALC on the basis of the work light signal and the protection light signal after the amplification. An example of the configuration of the optical amplification device 31 will be described later.

The work light signal and the protection light signal amplified by the optical amplification device 31 are input to an optical SW 32 through one output port (first output port) and another output port (second output port), respectively, of the optical amplification device 31.

The optical SW (optical switch) 32 selects either the work light signal or the protection light signal after the amplification output from the first output port or the second output port of the optical amplification device 31. The optical SW 32 switches the connection to each output port of the optical amplification device 31 in accordance with occurrence of failures in the work line 4-1 and the protection line 4-2, in order to selectively output a light signal to the optical receiver 33.

For example, if a failure occurs in the work line 4-1, the optical SW 32 switches the connection to each output port of the optical amplification device 31 such that the protection light signal transmitted through the protection line 4-2 is output to the optical receiver 33. When the work line 4-1 has recovered from the failure, the optical SW 32 may switch the connection to each output port of the optical amplification device 31 such that the work light signal transmitted through the work line 4-1 is output to the optical receiver 33.

Whether or not a failure has occurred in the work line 4-1 or the protection line 4-2 may be detected on the basis of results of detection performed by PDs 35 and 37 (refer to FIG. 8) provided in the optical amplification device 31, which will be described later. In this case, for example, if the result of the detection performed by the PD 35 is smaller than a first threshold value and the result of the detection performed by the PD 37 is equal to or larger than a second threshold value, the optical SW 32 selects the protection light signal amplified by the optical amplification device 31. On the other hand, if the result of the detection performed by the PD 35 is equal to or larger than the first threshold value, the optical SW 32 selects the work light signal amplified by the optical amplification device 31.

Occurrence of failures in the work line 4-1 and the protection line 4-2 may be detected by the optical SW 32 by comparing the levels of the work light signal and the protection light signal with the threshold values and by making a judgment.

Furthermore, occurrence of failures in the work line 4-1 and the protection line 4-2 may be detected by the optical amplification device 31 or the optical SW 32 on the basis of the levels of the work light signal and the protection light signal after the amplification performed by the optical amplification device 31, which will be described later.

The optical receiver (reception processing unit) 33 reproduces data from the work light signal or the protection light signal by performing given demodulation and decoding processes on the light signal selected by the optical SW 32.

By using the above-described configuration, the number of optical amplifiers installed may be suppressed while avoiding occurrence of an optical surge in the optical amplification device 31.

Next, an example of the configuration of the optical amplification device 31 will be described.

(1.2) Example of Configuration of Optical Amplification Device 31

Figure 8:
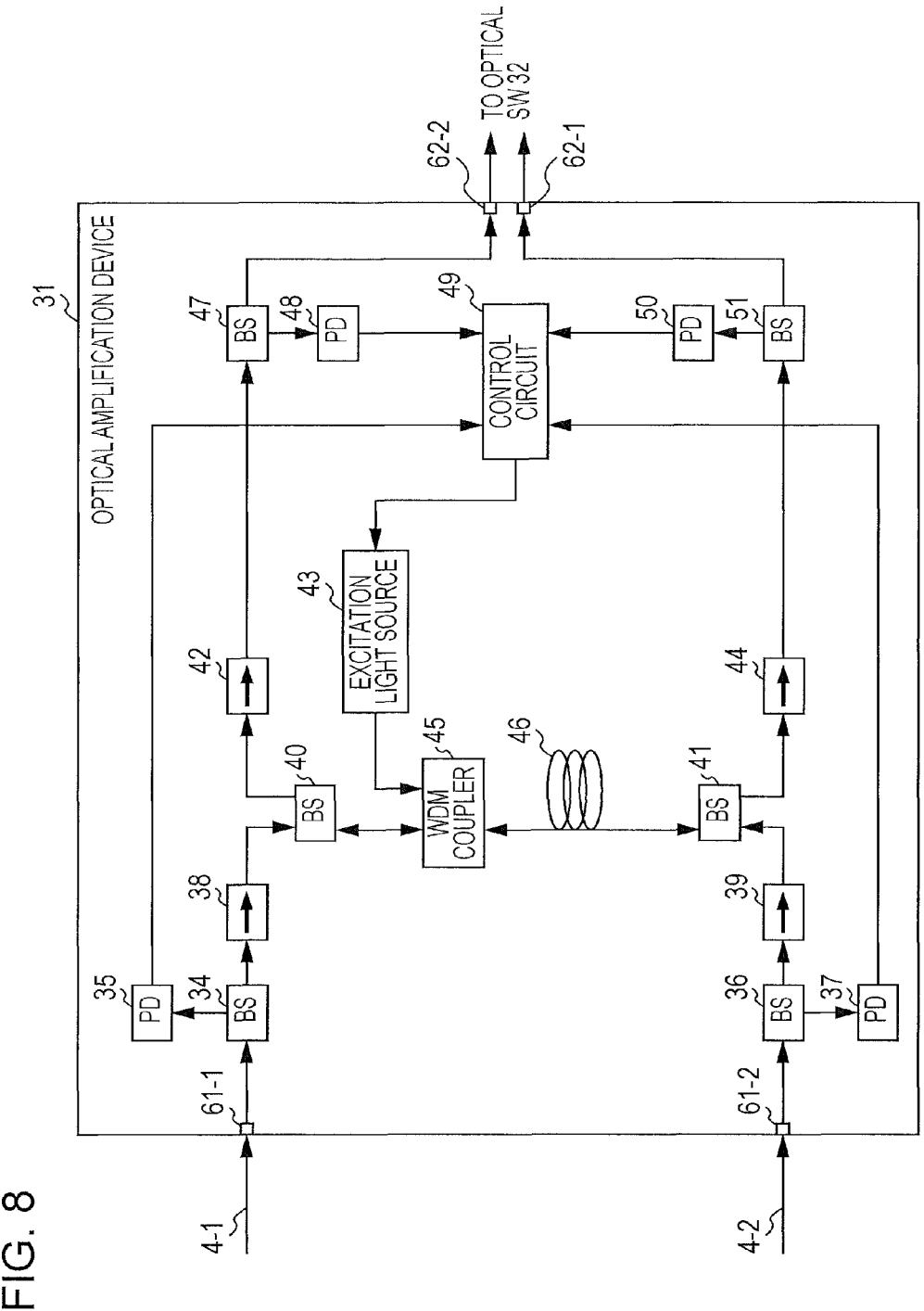
FIG. 8 illustrates an example of the configuration of an optical amplification device according to the embodiment.

FIG. 8 is a diagram illustrating an example of the configuration of the optical amplification device 31.

The optical amplification device 31 illustrated in FIG. 8 has, for example, input ports 61-1 and 61-2, BSs 34 and 36, the PDs 35 and 37, optical isolators 38 and 39, BSs 40 and 41, a WDM coupler 45, and an optical amplifier 46. The optical amplification device 31 also has, for example, optical isolators 42 and 44, BSs 47 and 51, PDs 48 and 50, a control circuit 49, an excitation light source 43, and output ports 62-1 and 62-2. A multiplexer includes the WDM coupler, an optical coupler, an arrayed waveguide gratings and so on.

The input port (first input port) 61-1 receives the work light signal transmitted through the work line 4-1 and outputs the received work light signal to the BS 34. On the other hand, the input port (second input port) 61-2 receives the protection light signal transmitted through the protection line 4-2 and outputs the received protection light signal to the BS 36.

The BS 34 divides the work light signal input from the input port 61-1 and outputs the divided work light signal to the PD 35 and the optical isolator 38. The BS 36 divides the protection light signal input from the input port 61-2 and outputs the divided protection light signal to the PD 37 and the optical isolator 39.

The PD 35 detects the level of the work light signal divided by the BS 34. The PD 37 detects the level of the protection light signal divided by the BS 36. The PDs 35 and 37 may, for example, generate electrical signals according to the optical power of the received light signals and detect the levels of the light signals by detecting the values of amplitude of the generated electrical signals.

That is, the BS 34 and the PD 35 serve as an example of a third detector that divides the work light signal input through the first optical transmission path 4-1 and that detects the level of the divided work light signal. The BS 36 and the PD 37 serve as an example of a fourth detector that divides the protection light signal input through the second optical transmission path 4-2 and that detects the level of the divided protection light signal.

The optical isolator 38 causes the work light signal divided by the BS 34 to pass along a path to the BS 40, while blocking light reflected from the BS 40 and the like. The optical isolator 39 causes the protection light signal divided by the BS 36 to pass along a path to the BS 41, while blocking light reflected from the BS 41 and the like.

The BS 40 inputs the work light signal that has passed through the optical isolator 38 to a first input/output unit of the optical amplifier 46, while outputting, to a path to the optical isolator 42, a protection light signal after amplification performed by the optical amplifier 46 output from the first input/output unit. For example, the transmittance of the BS 40 may vary between 10% and 99% and the reflectivity of the BS 40 may vary between 90% and 1%.

The BS 41 inputs the protection light signal that has passed through the optical isolator 39 to a second input/output unit of the optical amplifier 46 in a direction different from that of the work light signal, while outputting, to a path to the optical isolator 44, a work light signal after amplification performed by the optical amplifier 46 output from the second input/output unit. For example, the transmittance of the BS 41 may vary between 10% and 99% and the reflectivity of the BS 41 may vary between 90% and 1%.

The excitation light source 43 supplies excitation light controlled by the control circuit 49, which will be described later, to the optical amplifier 46 through the WDM coupler 45. The excitation light supplied from the excitation light source 43 is used for the amplification performed by the optical amplifier 46.

In the example illustrated in FIG. 8, the excitation light supplied from the excitation light source 43 is incident from the first input/output unit of the optical amplifier 46, but this method for supplying the excitation light is merely an example. For example, the WDM coupler 45 may be provided not on the first input/output unit side but on the second input/output unit side, and the excitation light may be incident from the second input/output unit side. Alternatively, a plurality of WDM couplers 45 may be provided on both the first input/output side and the second input/output side, and the excitation light may be incident from both sides.

That is, the excitation light source 43 serves as an example of an excitation light source that supplies excitation light for the amplification performed by the optical amplifier 46 to the optical amplifier 46 from at least either the first input/output unit or the second input/output unit of the optical amplifier 46.

The WDM coupler 45 combines the work light signal input from the BS 40 and the excitation light supplied from the excitation light source 43 and inputs the resultant light to the first input/output unit of the optical amplifier 46. In addition, the WDM coupler 45 selects the wavelength of the protection light signal after the amplification input from the optical amplifier 46, and outputs the protection light signal to the BS 40.

The optical amplifier 46 amplifies the work light signal input from the WDM coupler 45 to the first input/output unit and the protection light signal input from the BS 41 to the second input/output unit in a direction different from that of the work light signal. Therefore, the optical amplifier 46 has a configuration with which light signals input from directions different from each other may be amplified.

For example, the optical amplifier 46 may include a rare-earth doped optical fiber and amplify each light signal using the excitation light supplied from the excitation light source 43. Alternatively, the optical amplifier 46 may be configured by a Raman amplifier. In this case, each light signal is subjected to Raman amplification by the excitation light supplied from the excitation light source 43. Furthermore, each light signal may be amplified using, instead of the optical amplifier 46, a semiconductor optical amplifier (SOA).

The optical amplifier 46 outputs the work light signal after the amplification from the second input/output unit to the BS 41 and the protection light signal after the amplification from the first input/output unit to the BS 40.

That is, the optical amplifier 46 serves as an example of an optical amplifier that amplifies the work light signal input from the first input port 61-1 to the first input/output unit and the protection light signal input from the second input port 61-2 to the second input/output unit in a direction different from that of the work light signal and that outputs the work light signal after the amplification from the second input/output unit and the protection light signal after the amplification from the first input/output unit.

The optical isolator 42 causes the protection light signal after the amplification output from the BS 40 to pass along a path to the BS 47, while blocking light reflected from the BS 47. The optical isolator 44 causes the work light signal after the amplification output from the BS 41 to pass along a path to the BS 51, while blocking light reflected from the BS 51.

The BS 47 divides the protection light signal after the amplification input from the optical isolator 42 and outputs the divided protection light signal after the amplification to the PD 48 and the output port 62-2. The BS 51 divides the work light signal after the amplification input from the optical isolator 44 and outputs the divided work light signal after the amplification to the PD 50 and the output port 62-1.

The output port 62-1 receives the work light signal after the amplification output from the BS 51 and outputs the received work light signal after the amplification to the optical SW 32.

The output port 62-2 receives the protection light signal after the amplification output from the BS 47 and outputs the received protection light signal after the amplification to the optical SW 32.

That is, the output port 62-1 serves as an example of a first output port that outputs the work light signal after the amplification output from the second input/output unit of the optical amplifier 46. The output port 62-2 serves as an example of a second output port that outputs the protection light signal after the amplification output from the first input/output unit of the optical amplifier 46.

The PD 48 detects the level of the protection light signal after the amplification that has been divided by the BS 47. The PD 50 detects the level of the work light signal after the amplification that has been divided by the BS 51. The PDs 48 and 50 may, for example, generate electrical signals according to the optical power of the received light signals and detect the levels of the light signals by detecting the values of amplitude of the generated electrical signals.

That is, the BS 51 and the PD 50 serve as an example of a first detector that divides the work light signal after the amplification output from the second input/output unit of the optical amplifier 46 and that detects the level of the divided work light signal after the amplification. The BS 47 and the PD 48 serve as an example of a second detector that divides the protection light signal after the amplification output from the first input/output unit of the optical amplifier 46 and that detects the level of the divided protection light signal after the amplification.

The control circuit (controller) 49 controls the excitation light supplied from the excitation light source 43 to the optical amplifier 46 on the basis of the work light signal and the protection light signal after the amplification. The control circuit 49 may be, for example, realized by a digital signal processor (DSP). Alternatively, the control circuit 49 may be, for example, realized by a general-purpose processor or by a circuit that provides the same functions as the DSP, such as a field-programmable gate array (FPGA) or an application-specific integrated circuit (ASIC).

For example, the control circuit 49 controls the optical power of the excitation light supplied from the excitation light source 43 to the optical amplifier 46 on the basis of at least results of detection performed by the PDs 48 and 50. Alternatively, the control circuit 49 may control the optical power of the excitation light using results of detection performed by the PDs 35 and 37.

For example, if the result of the detection performed by the PD 35 is equal to or larger than the first threshold value, the control circuit 49 judges that no failure has occurred in the work line 4-1. On the other hand, if the result of the detection performed by the PD 35 is smaller than the first threshold value, the control circuit 49 judges that a failure such as a disconnection of a fiber has occurred in the work line 4-1. Similarly, if the result of the detection performed by the PD 37 is equal to or larger than the second threshold value, the control circuit 49 judges that no failure has occurred in the protection line 4-2. If the result of the detection performed by the PD 37 is smaller than the second threshold value, the control circuit 49 judges that a failure has occurred in the protection line 4-2. The first and second threshold values may be the same or may be different.

Figure 17:
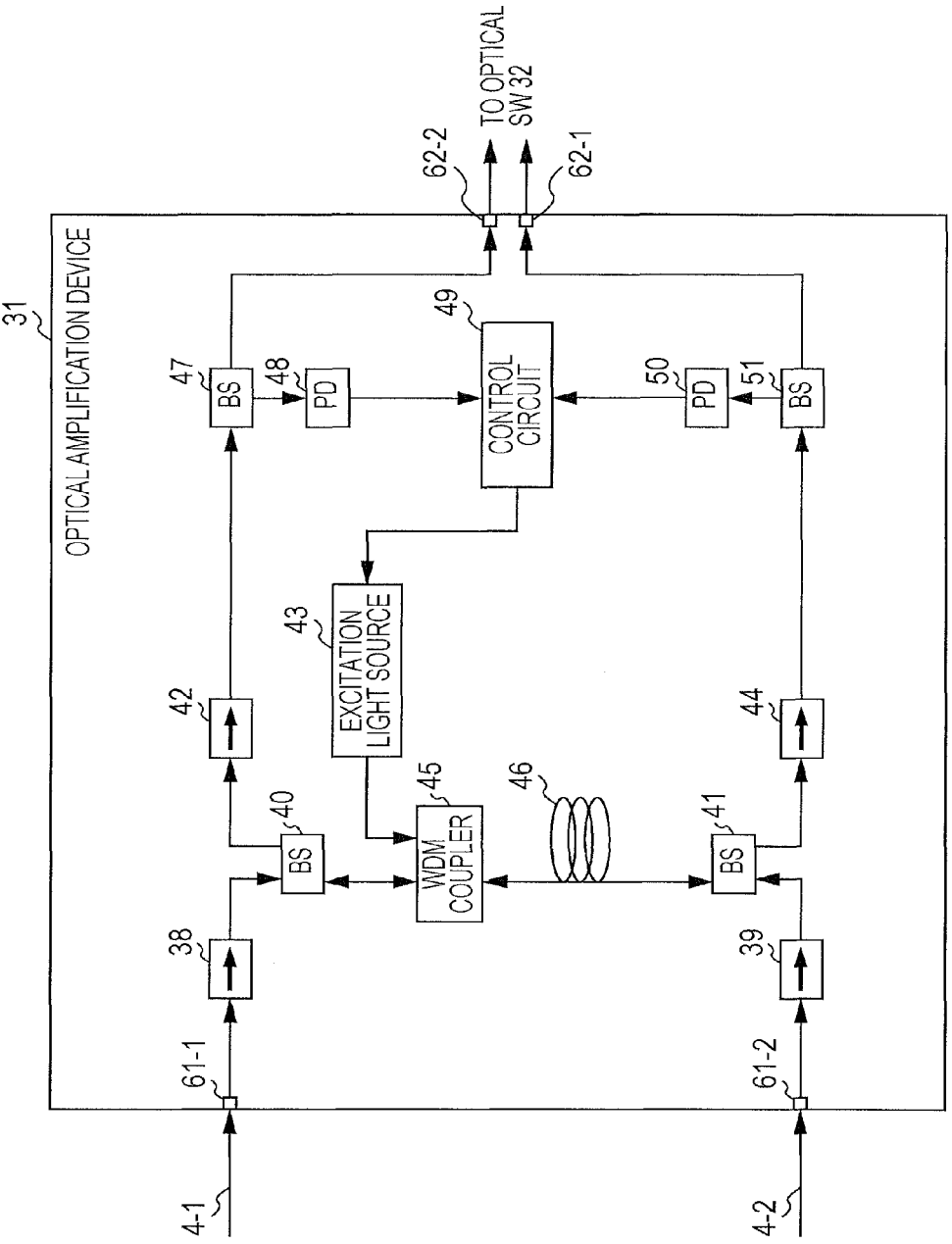
FIG. 17 illustrates another example of the configuration of the optical amplification device according to the embodiment.

Occurrence of failures in the work line 4-1 and the protection line 4-2 may be judged on the basis of the results of the detection performed by the PDs 50 and 48, respectively. In this case, in the optical amplification device 31, the BS 34, the PD 35, the BS 36, and the PD 37 may be omitted as illustrated in FIG. 17.

When performing the ALC on the optical amplifier 46, the control circuit 49 changes parameters to be used to control the optical power of the excitation light supplied from the excitation light source 43 in accordance with the occurrence of failures in the work line 4-1 and the protection line 4-2.

Figure 9:
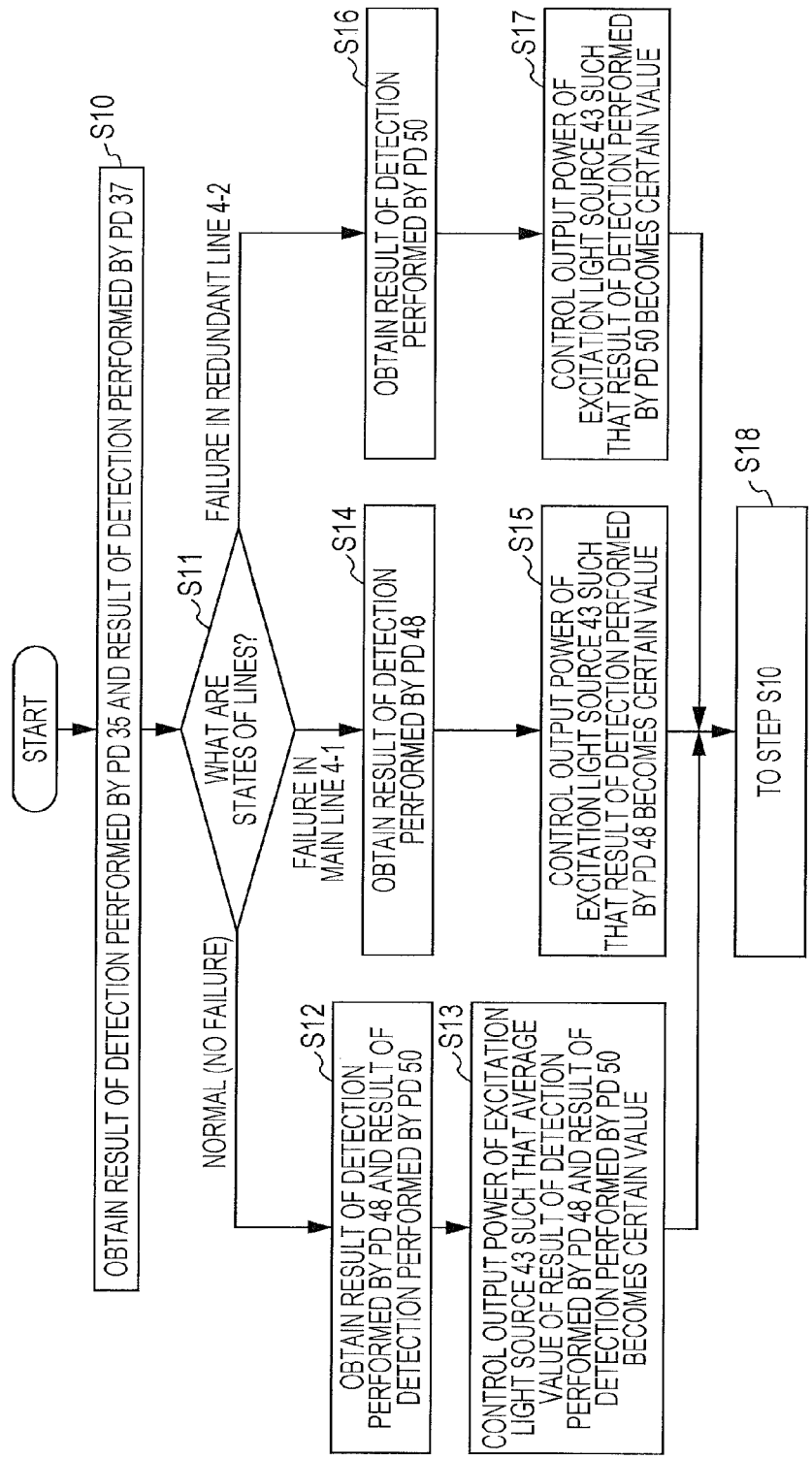
FIG. 9 illustrates an example of operations performed by the optical amplification device illustrated in FIG. 8.

FIG. 9 illustrates an example of operations performed by the control circuit 49.

As illustrated in FIG. 9, first, the control circuit 49 obtains the level of the work light signal detected by the PD 35 and the level of the protection light signal detected by the PD 37 (operation S10).

The control circuit 49 then makes judgments as to occurrence of failures in the work line 4-1 and the protection line 4-2 on the basis of the results of the detection performed by the PDs 35 and 37, respectively (operation S11).

If it is judged that no failure has occurred in both the work line 4-1 and the protection line 4-2, that is, if both the work line 4-1 and the protection line 4-2 are normal (route "normal (no failure)" in operation S11), the control circuit 49 obtains the level of the protection light signal after the amplification detected by the PD 48 and the level of the work light signal after the amplification detected by the PD 50 (operation S12).

The control circuit 49 then calculates the average value of the results of the detection performed by the PDs 48 and 50, and controls the optical power of the excitation light output from the excitation light source 43 such that the calculated average value becomes a given value (operation S13). Thereafter, processing performed by the control circuit 49 proceeds to operation S10 (operation S18).

That is, in this case, the control circuit 49 performs the ALC on the optical amplifier 46 such that the average value of the level of the work light signal after the amplification and the level of the protection light signal after the amplification becomes the given value. In the example illustrated in FIG. 9, the control circuit 49 performs the ALC on the basis of the average value of the level of the work light signal after the amplification and the level of the protection light signal after the amplification. For example, the ALC may be performed on the basis of a weighted average obtained by weighting either the level of the work light signal after the amplification or the level of the protection light signal after the amplification. In this case, in view of an optical surge that may occur in the optical amplifier 46 upon a switching operation of the optical SW 32, it is desirable to determine a weighting coefficient of the level of the protection light signal after the amplification to be larger than a weighting coefficient of the level of the work light signal after the amplification.

On the other hand, if it is judged that a failure has occurred in the work line 4-1 (route "failure in work line 4-1" in operation S11), the control circuit 49 obtains the level of the protection light signal after the amplification detected by the PD 48 (operation S14).

The control circuit 49 then controls the optical power of the excitation light output from the excitation light source 43 such that the result of the detection performed by the PD 48 becomes a given value (operation S15). Thereafter, the processing performed by the control circuit 49 proceeds to operation S10 (operation S18).

That is, in this case, the control circuit 49 performs the ALC on the optical amplifier 46 such that the level of the protection light signal after the amplification becomes the given value.

If it is judged that a failure has occurred in the protection line 4-2 (route "failure in protection line 4-2" in operation S11), the control circuit 49 obtains the level of the work light signal after the amplification detected by the PD 50 (operation S16).

The control circuit 49 then controls the optical power of the excitation light output from the excitation light source 43 such that the result of the detection performed by the PD 50 becomes a given value (operation S17). Thereafter, the processing performed by the control circuit 49 proceeds to operation S10 (operation S18).

That is, in this case, the control circuit 49 performs the ALC on the optical amplifier 46 such that the work light signal after the amplification becomes the given value. Although not illustrated in FIG. 9, if failures occur in both the work line 4-1 and the protection line 4-2, the control circuit 49 may control the level of the optical power of the excitation light to achieve a given level and wait until either the work line 4-1 or the protection line 4-2 recovers from the corresponding failure.

As described above, in this embodiment, when the work line 4-1 and the protection line 4-2 are normal, the optical amplifier 46 is subjected to the ALC on the basis of the work light signal after the amplification and the protection light signal after the amplification. Therefore, even if an operation for switching the line is performed after occurrence of a failure, a sudden increase in the amplification gain may be suppressed. For example, when the optical amplifier 46 includes a rare-earth doped optical fiber, an increase in the population inversion ratio of a rare-earth ion may be suppressed. As a result, occurrence of an optical surge in the optical amplification device 31 may be effectively suppressed.

In addition, compared to the configuration illustrated in FIG. 6 as an example in the description of section [1], increases in the size and the manufacturing cost of the optical amplification device 31 may be suppressed.

[3] First Modification

Although the level of the work light signal after the amplification and the level of the protection light signal after the amplification are individually detected in the above-described embodiment, for example, the level of combined signals obtained by combining the work light signal after the amplification and the protection light signal after the amplification may be detected, and control may be performed on the basis of a result of the detection, as in this modification.

Figure 10:
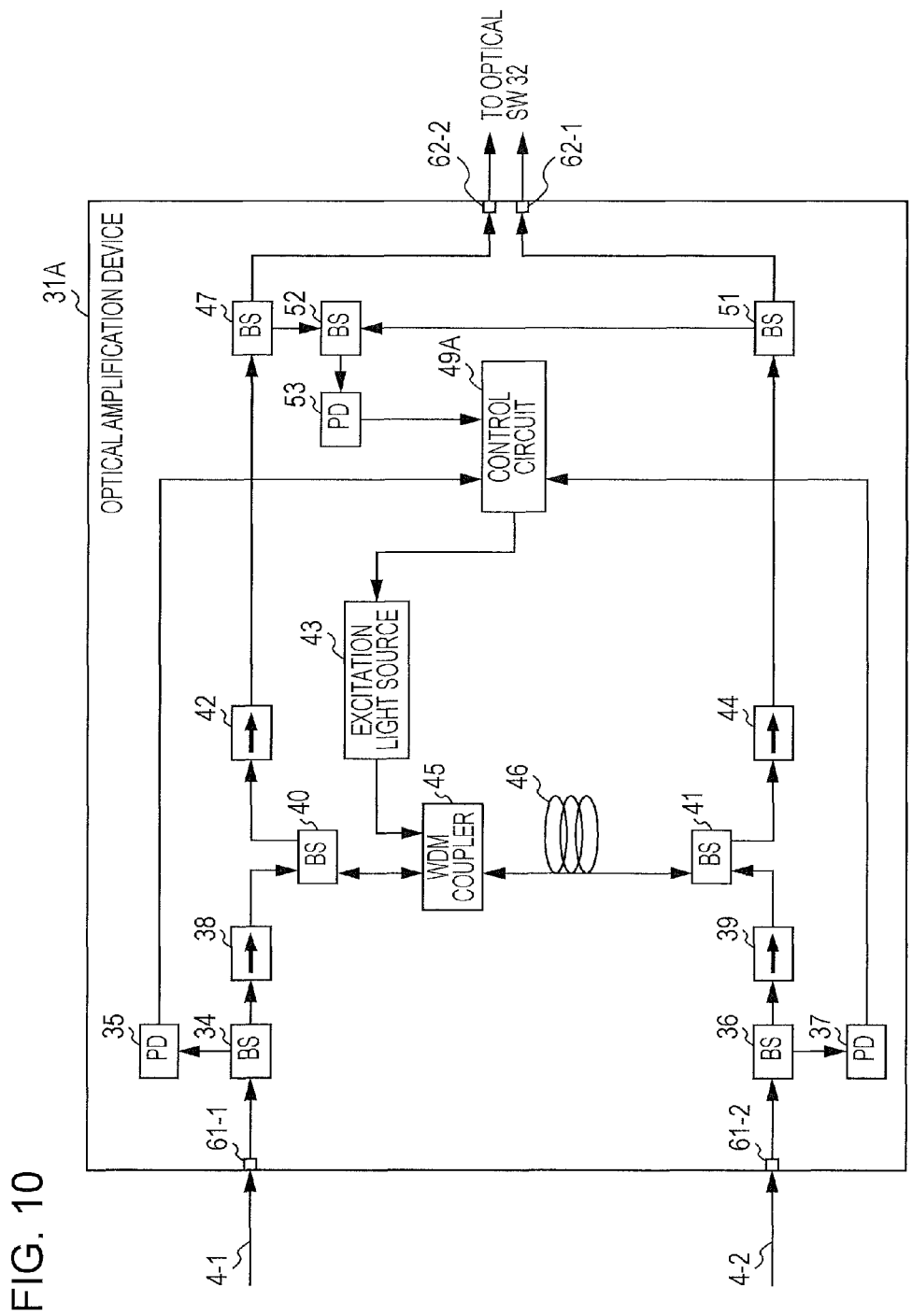
FIG. 10 illustrates an example of the configuration of an optical amplification device according to a first modification.

Therefore, as illustrated in FIG. 10 as an example, an optical amplification device 31A has input ports 61-1 and 61-2, BSs 34 and 36, PDs 35 and 37, optical isolators 38 and 39, BSs 40 and 41, a WDM coupler 45, and an optical amplifier 46. The optical amplification device 31A also has, for example, optical isolators 42 and 44, BSs 47, 51, and 52, a PD 53, a control circuit 49A, an excitation light source 43, and output ports 62-1 and 62-2. Components illustrated in FIG. 10 having the same reference numerals as those used for the components illustrated in FIG. 8 have the same functions as the components illustrated in FIG. 8, and therefore description thereof is omitted.

The BS 52 combines a protection light signal after amplification divided by the BS 47 and a work light signal after amplification divided by the BS 51, and outputs the light signals after the combining (combined signals) to the PD 53.

The PD 53 detects the level of the combined signals output from the BS 52. In the same manner as the other PDs 35 and 37, for example, the PD 53 may generate an electrical signal according to the optical power of the combined signals that have been received and detect the level of the combined signals by detecting the value of amplitude of the generated electrical signal.

That is, the BSs 47, 51, and 52 and the PD 53 divide the work light signal after the amplification output from the second input/output unit of the optical amplifier 46, as well as the protection light signal after the amplification output from the first input/output unit of the optical amplifier 46. These components serve as an example of a combined signals detector that combines a divided work light signal after amplification and a divided protection light signal after amplification and that detects the level of the light signals after the combining.

The control circuit (controller) 49A controls the excitation light supplied from the excitation light source 43 to the optical amplifier 46 on the basis of the result of the detection performed by the PD 53. Alternatively, the control circuit 49A may control the excitation light using the results of the detection performed by the PDs 35 and 37.

For example, if the result of the detection performed by the PD 35 is equal to or larger than the first threshold value, the control circuit 49A judges that no failure has occurred in the work line 4-1. On the other hand, if the result of the detection performed by the PD 35 is smaller than the first threshold value, the control circuit 49A judges that a failure such as a disconnection of a fiber has occurred in the work line 4-1. Similarly, if the result of the detection performed by the PD 37 is equal to or larger than the second threshold value, the control circuit 49A judges that no failure has occurred in the protection line 4-2. If the result of the detection performed by the PD 37 is smaller than the second threshold value, the control circuit 49A judges that a failure has occurred in the protection line 4-2.

Figure 18:
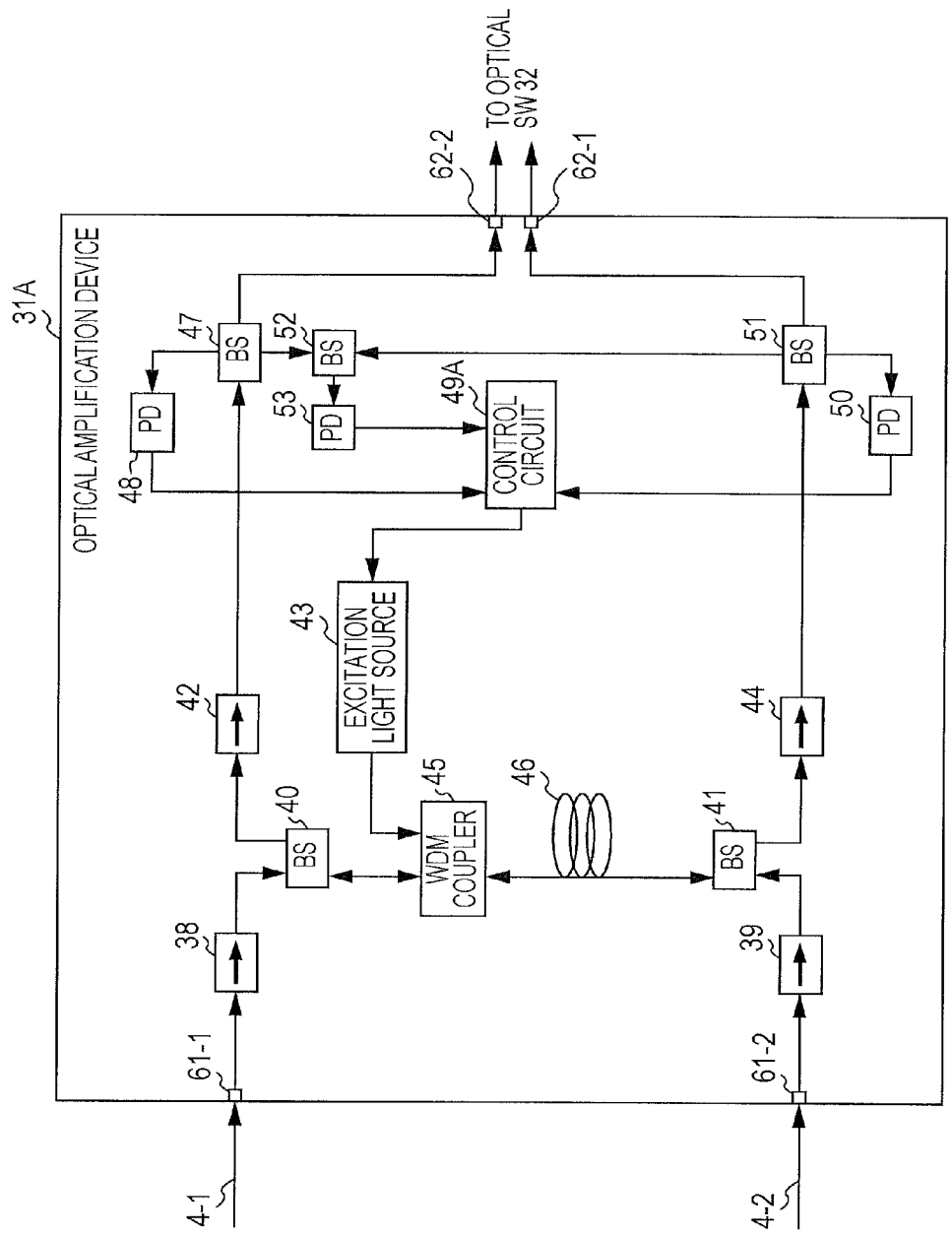
FIG. 18 illustrates another example of the configuration of the optical amplification device according to the first modification.

Occurrence of failures in the work line 4-1 and the protection line 4-2 may be judged on the basis of the level of the work light signal after the amplification divided by the BS 51 and the level of the protection light signal after the amplification divided by the BS 47, respectively. In this case, in the optical amplification device 31A, PDs 50 and 48 are added as a configuration for detecting the level of the work light signal after the amplification divided by the BS 51 and the level of the protection light signal after the amplification divided by the BS 47, respectively, as illustrated in FIG. 18, but the BS 34, the PD 35, the BS 36, and the PD 37 may be omitted from the optical amplification device 31A.

When performing the ALC on the optical amplifier 46, the control circuit 49A changes a method for controlling the excitation light supplied from the excitation light source 43 to the optical amplifier 46 in accordance with the occurrence of failures in the work line 4-1 and the protection line 4-2.

Figure 11:
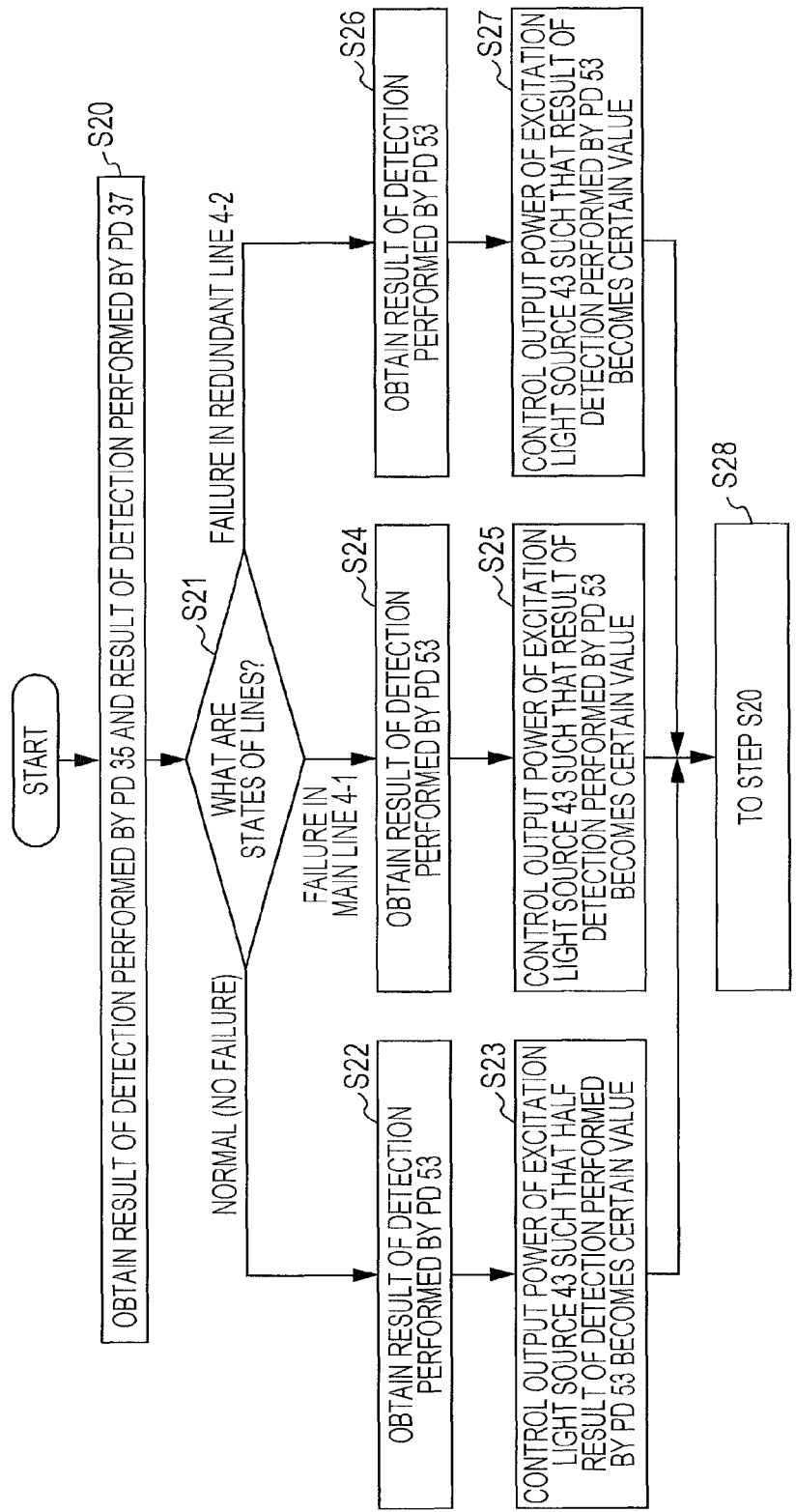
FIG. 11 illustrates an example of operations performed by the optical amplification device illustrated in FIG. 11.

FIG. 11 illustrates an example of operations performed by the control circuit 49A.

As illustrated in FIG. 11 as an example, first, the control circuit 49A obtains the level of the work light signal detected by the PD 35 and the level of the protection light signal detected by the PD 37 (operation S20).

The control circuit 49A then makes judgments as to occurrence of failures in the work line 4-1 and the protection line 4-2 on the basis of the results of the detection performed by the PDs 35 and 37, respectively (operation S21).

If it is judged that no failure has occurred in both the work line 4-1 and the protection line 4-2, that is, if both the work line 4-1 and the protection line 4-2 are normal (route "normal (no failure)" in operation S21), the control circuit 49A obtains the level of the combined signals detected by the PD 53 (operation S22).

The control circuit 49A then calculates half the value of the result of the detection performed by the PD 53, and controls the optical power of the excitation light output from the excitation light source 43 such that the calculated value becomes a given value (operation S23). Thereafter, processing performed by the control circuit 49A proceeds to operation S20 (operation S28).

That is, in this case, the control circuit 49A performs the ALC on the optical amplifier 46 such that the average value of the level of the work light signal after the amplification and the level of the protection light signal after the amplification becomes the given value.

On the other hand, if it is judged that a failure has occurred in the work line 4-1 (route "failure in work line 4-1" in operation S21), the control circuit 49A obtains the level of the combined signals detected by the PD 53 (operation S24). In this case, since a failure has occurred in the work line 4-1, the combined signals mainly include the protection light signal after the amplification.

The control circuit 49A then controls the optical power of the excitation light output from the excitation light source 43 such that the result of the detection performed by the PD 53 becomes a given value (operation S25). Thereafter, the processing performed by the control circuit 49A proceeds to operation S20 (operation S28).

That is, in this case, the control circuit 49A performs the ALC on the optical amplifier 46 such that the level of the protection light signal after the amplification becomes the given value.

If it is judged that a failure has occurred in the protection line 4-2 (route "failure in protection line 4-2" in operation S21), the control circuit 49A obtains the level of the combined signals detected by the PD 53 (operation S26). In this case, since the failure has occurred in the protection line 4-2, the combined signals mainly include the work light signal after the amplification.

The control circuit 49A then controls the optical power of the excitation light output from the excitation light source 43 such that the result of the detection performed by the PD 53 becomes a given value (operation S27). Thereafter, the processing performed by the control circuit 49A proceeds to operation S20 (operation S28).

That is, in this case, the control circuit 49A performs the ALC on the optical amplifier 46 such that the work light signal after the amplification becomes the given value. Although not illustrated in FIG. 11, if failures occur in both the work line 4-1 and the protection line 4-2, the control circuit 49A may control the level of the optical power of the excitation light to achieve a given level and wait until either the work line 4-1 or the protection line 4-2 recovers from the corresponding failure.

According to this modification, the same effects as those according to the embodiment may be obtained. In addition, the size and the manufacturing cost of the optical amplification device 31A may be further reduced.

[4] Second Modification

In the above-described optical amplification devices 31 and 31A, the BSs 40 and 41 may be replaced with optical circulators 54 and 55, respectively.

Figure 12:
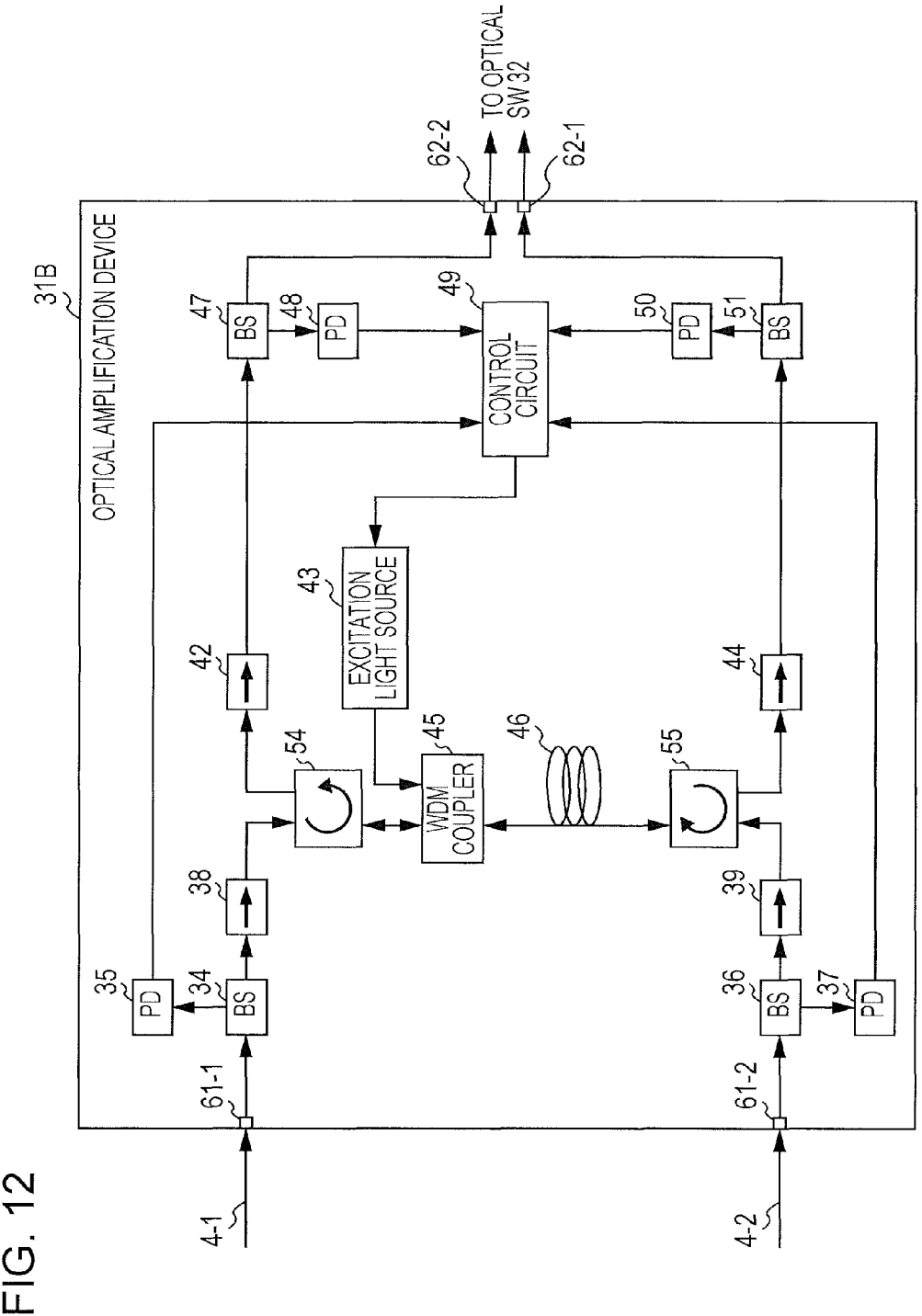
FIG. 12 illustrates an example of the configuration of an optical amplification device according to a second modification.
Figure 19:
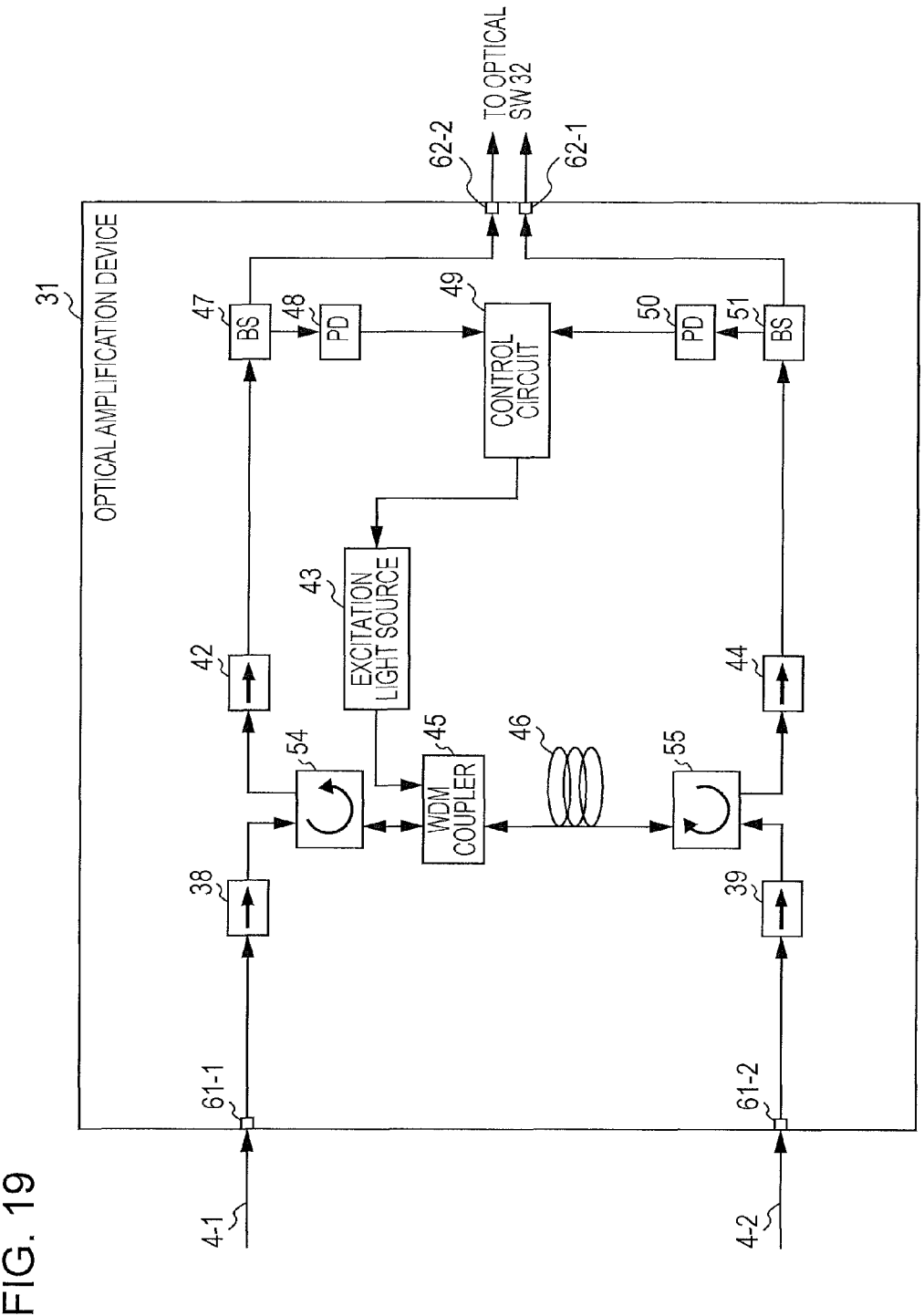
FIG. 19 illustrates another example of the configuration of the optical amplification device according to the second modification.
Figure 20:
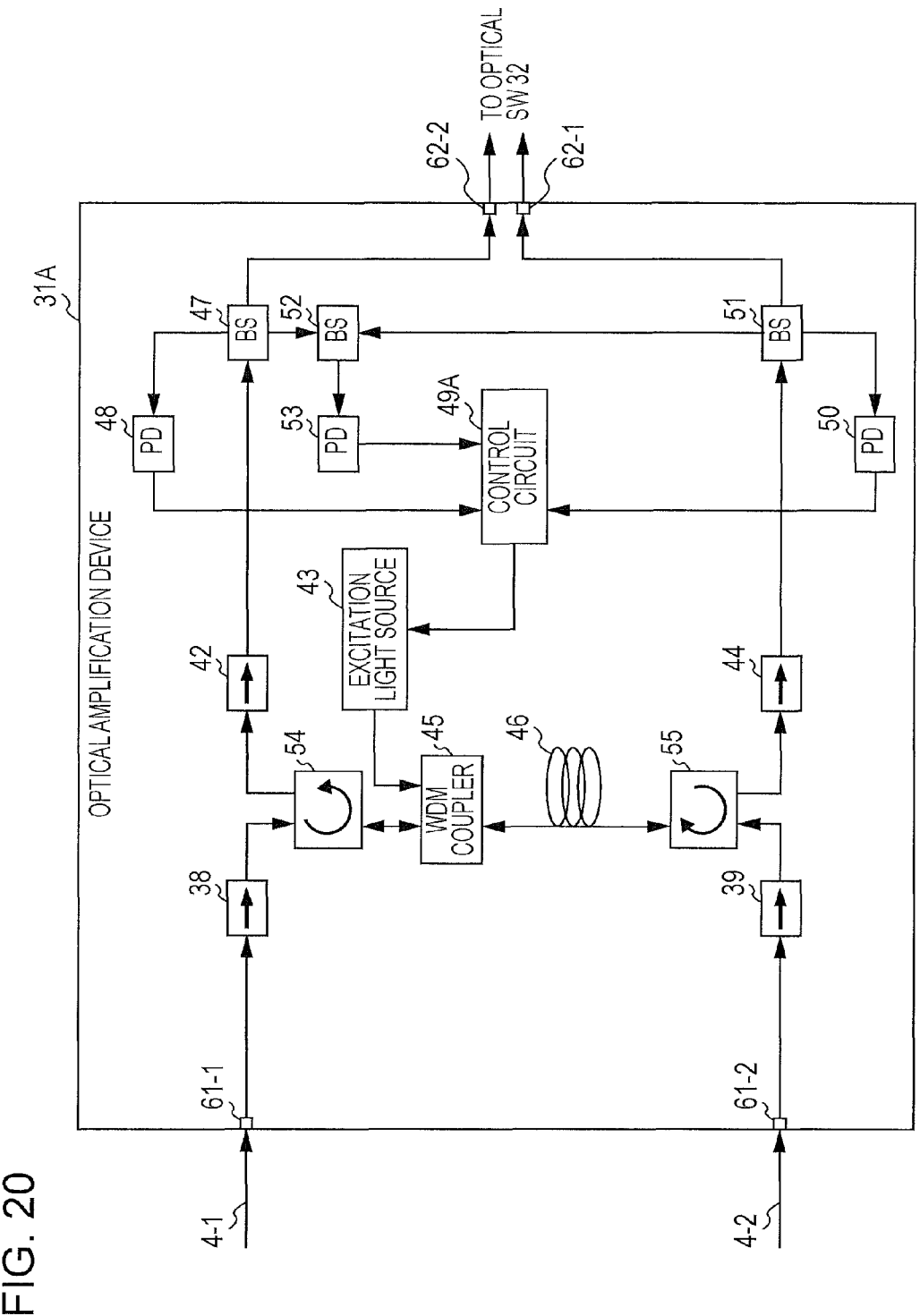
FIG. 20 illustrates another example of the configuration of the optical amplification device according to the second modification.

Therefore, as illustrated in FIG. 12 as an example, an optical amplification device 31B according to this modification has input ports 61-1 and 61-2, BSs 34 and 36, PDs 35 and 37, optical isolators 38 and 39, the optical circulators 54 and 55, and a WDM coupler 45. The optical amplification device 31B also has, for example, an optical amplifier 46, optical isolators 42 and 44, BSs 47 and 51, PDs 48 and 50, a control circuit 49, an excitation light source 43, and output ports 62-1 and 62-2. Components illustrated in FIG. 12 having the same reference numerals as those used for the components illustrated in FIG. 8 have the same functions as the components illustrated in FIG. 8, and therefore description thereof is omitted. FIG. 12 illustrates an example obtained by replacing the BSs 40 and 41 of the optical amplification device 31 illustrated in FIG. 8 with the optical circulators 54 and 55. As illustrated in FIG. 19, BSs 40 and 41 of an optical amplification device 31 illustrated in FIG. 17 may be replaced by the optical circulators 54 and 55. Alternatively, the BSs 40 and 41 of the optical amplification device 31A illustrated in FIG. 10 may be replaced by the optical circulators 54 and 55. Furthermore, as illustrated in FIG. 20, BSs 40 and 41 of an optical amplification device 31A illustrated in FIG. 18 may be replaced by the optical circulators 54 and 55.

The optical circulator 54 inputs a work light signal that has passed through the optical isolator 38 to a path to a first input/output unit of the optical amplifier 46, as well as outputting, to a path to the optical isolator 42, a protection light signal that has been amplified by the optical amplifier 46 and that has been output from the path from the first input/output unit.

That is, the optical circulator 54 serves as an example of a first optical circulator that inputs the work light signal input from a first optical transmission path 4-1 to the first input/output unit of the optical amplifier 46 and that outputs, to the second output port 62-2, the protection light signal after the amplification output from the first input/output unit.

The optical circulator 55 inputs a protection light signal that has passed through the optical isolator 39 to a path to a second input/output unit of the optical amplifier 46, as well as outputting, to a path to the optical isolator 44, a work light signal after the amplification performed by the optical amplifier 46 and that has been output from the path from the second input/output unit.

That is, the optical circulator 55 serves as an example of a second optical circulator that inputs the protection light signal input from a second optical transmission path 4-2 to the second input/output unit of the optical amplifier 46 and that outputs, to the first output port 62-1, the work light signal after the amplification output from the second input/output unit.

According to this modification, the same effects as those according to the embodiment may be obtained. In addition, because the amount of reflected light incident upon the optical isolators 38 and 39 may be reduced, thereby further stabilizing the operation of the optical amplification device 31B.

[5] Third Modification

In the above-described optical amplification devices 31, 31A, and 31B, the WDM coupler 45 and the optical amplifier 46 may be configured by WDM couplers 57-1 and 57-2, optical fiber amplifiers 58-1 and 58-2, a gain-flat filter (GFF) 59, and a BS 56.

Figure 13:
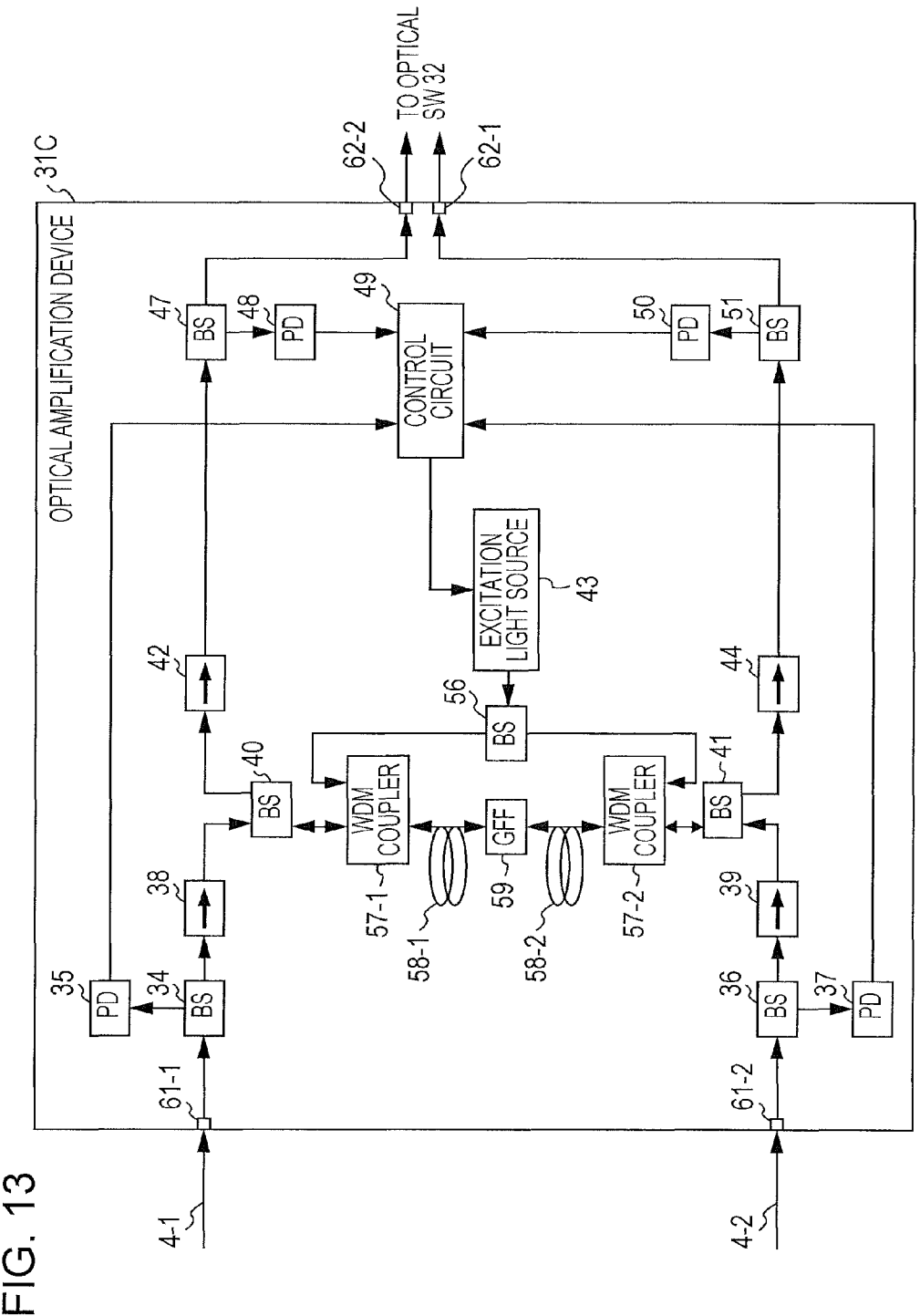
FIG. 13 illustrates an example of the configuration of an optical amplification device according to a third modification.

Therefore, as illustrated in FIG. 13 as an example, an optical amplification device 31C according to this modification has input ports 61-1 and 61-2, BSs 34 and 36, PDs 35 and 37, optical isolators 38 and 39, BSs 40 and 41, the WDM couplers 57-1 and 57-2, and the BS 56. The optical amplification device 31C also has, for example, the optical fiber amplifiers 58-1 and 58-2, the GFF 59, optical isolators 42 and 44, BSs 47 and 51, PDs 48 and 50, a control circuit 49, an excitation light source 43, and output ports 62-1 and 62-2. Components illustrated in FIG. 13 having the same reference numerals as those used for the components illustrated in FIG. 8 have the same functions as the components illustrated in FIG. 8, and therefore description thereof is omitted. FIG. 13 illustrates an example obtained by replacing the WDM coupler 45 and the optical amplifier 46 of the optical amplification device 31 illustrated in FIG. 8 with the WDM couplers 57-1 and 57-2, the optical fiber amplifiers 58-1 and 58-2, the GFF 59, and the BS 56. The optical amplification devices 31 illustrated in FIGS. 17 and 19, the optical amplification devices 31A illustrated in FIGS. 10, 18, and 20, and the optical amplification device 31B illustrated in FIG. 12 may be configured by making the same replacement.

Figure 21:
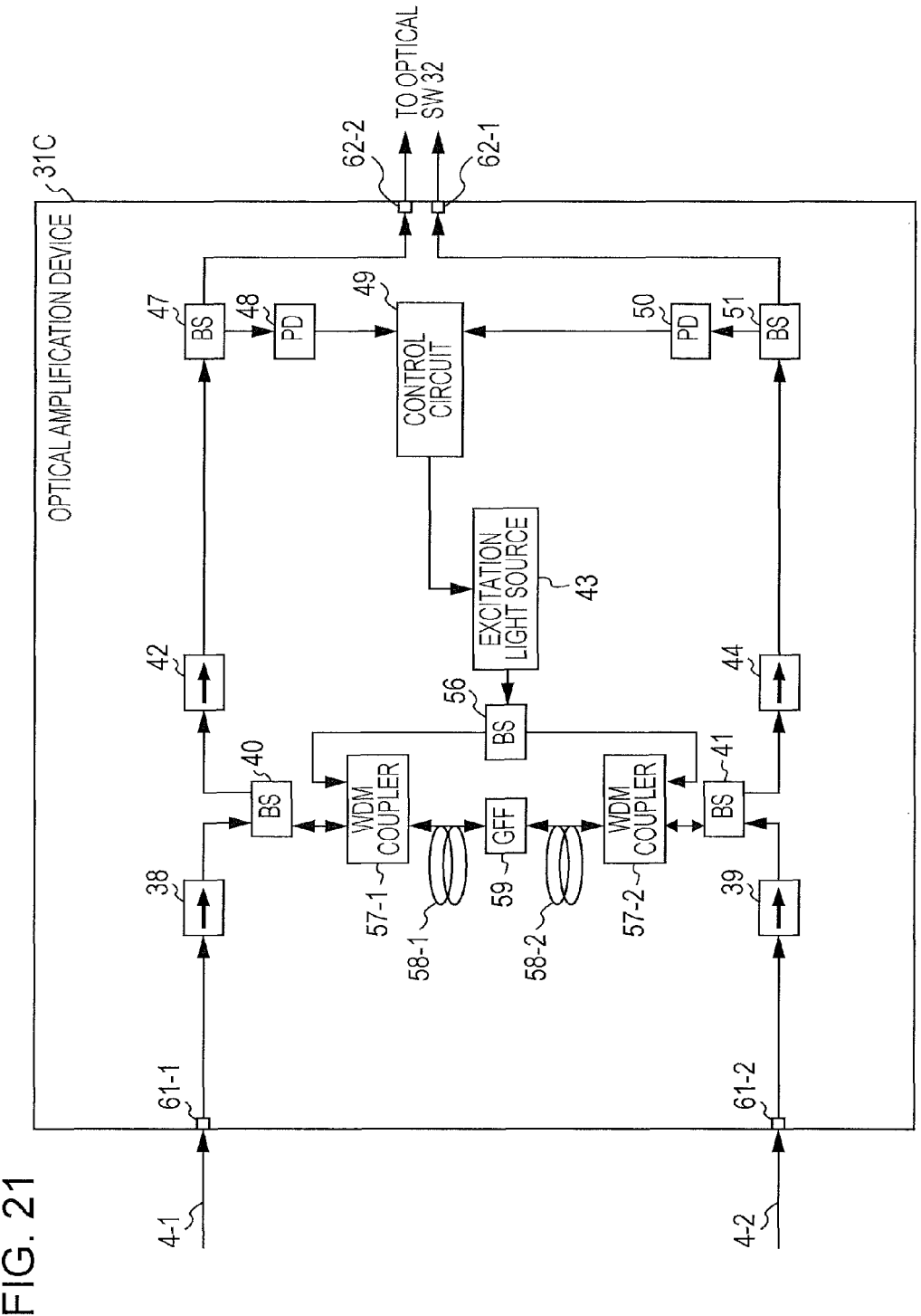
FIG. 21 illustrates another example of the configuration of the optical amplification device according to the third modification.

Furthermore, occurrence of failures in a work line 4-1 and a protection line 4-2 may be judged on the basis of results of detection performed by the PDs 50 and 48, respectively. In this case, in the optical amplification device 31C, the BS 34, the PD 35, the BS 36, and the PD 37 may be omitted as illustrated in FIG. 21.

The BS 56 divides the excitation light supplied from the excitation light source 43 and inputs the divided excitation light to the WDM couplers 57-1 and 57-2. Therefore, the excitation light supplied from the excitation light source 43 is incident from both one end of the optical fiber amplifier 58-1 that serves as a first input/output unit of the optical amplifier 46 and one end of the optical fiber amplifier 58-2 that serves as a second input/output unit of the optical amplifier 46.

The WDM coupler 57-1 combines a work light signal input from the BS 40 and the excitation light input from the BS 56 and inputs the resultant light to the one end of the optical fiber amplifier 58-1. The WDM coupler 57-1 also selects the wavelength of a protection light signal after amplification input from the optical fiber amplifier 58-1 and outputs the protection light signal to the BS 40.

The WDM coupler 57-2 combines a protection light signal input from the BS 41 and the excitation light input from the BS 56 and inputs the resultant light to the one end of the optical fiber amplifier 58-2. The WDM coupler 57-2 also selects the wavelength of a work light signal after amplification input from the optical fiber amplifier 58-2 and outputs the work light signal to the BS 41.

The optical fiber amplifier (first rare-earth doped optical fiber) 58-1, which is connected to the first input/output unit of the optical amplifier 46, amplifies the work light signal input to the one end thereof from the WDM coupler 57-1, and outputs the amplified work light signal to a path to the WDM coupler 57-2. In addition, the optical fiber amplifier 58-1 amplifies the protection light signal after the amplification performed by the optical fiber amplifier 58-2 input to another end thereof from the path from the WDM coupler 57-2, and outputs the amplified protection light signal to a path to the WDM coupler 57-1.

The optical fiber amplifier (second rare-earth doped optical fiber) 58-2, which is connected in cascade to the optical fiber amplifier 58-1 and to the second input/output unit of the optical amplifier 46, amplifies the protection light signal input to the one end thereof from the WDM coupler 57-2, and outputs the amplified protection light signal to a path to the WDM coupler 57-1. In addition, the optical fiber amplifier 58-2 amplifies the work light signal after the amplification performed by the optical fiber amplifier 58-1 input to another end thereof from the path from the WDM coupler 57-1, and outputs the amplified work light signal to a path to the WDM coupler 57-2.

The optical fiber amplifiers 58-1 and 58-2 may be configured by Raman amplifiers. In this case, each light signal is subjected to Raman amplification by the excitation light supplied from the excitation light source 43. Furthermore, instead of the optical fiber amplifiers 58-1 and 58-2, a plurality of SOAs may be used.

The GFF 59 is a filter located between the optical fiber amplifiers 58-1 and 58-2 and flattens the wavelength dependence characteristics of the amplification gain of the optical fiber amplifiers 58-1 and 58-2. The GFF 59 desirably has, for example, a filter characteristic that blocks the wavelength range (for example, a 980 nm range or a 1480 nm range) of the excitation light supplied from the excitation light source 43.

According to this modification, the same effects as those according to the embodiment may be obtained. In addition, the amplification gain of the optical amplification device 31C may be flattened, and therefore a light signal having a higher quality may be obtained.

[6] Fourth Modification

In the above-described optical amplification devices 31, 31A, 31B, and 31C, a variable optical attenuator (VOA) 60-1 may be arranged between the input port 61-1 and the BS 34, and a second VOA 60-2 may be arranged between the input port 61-2 and the BS 34.

Figure 14:
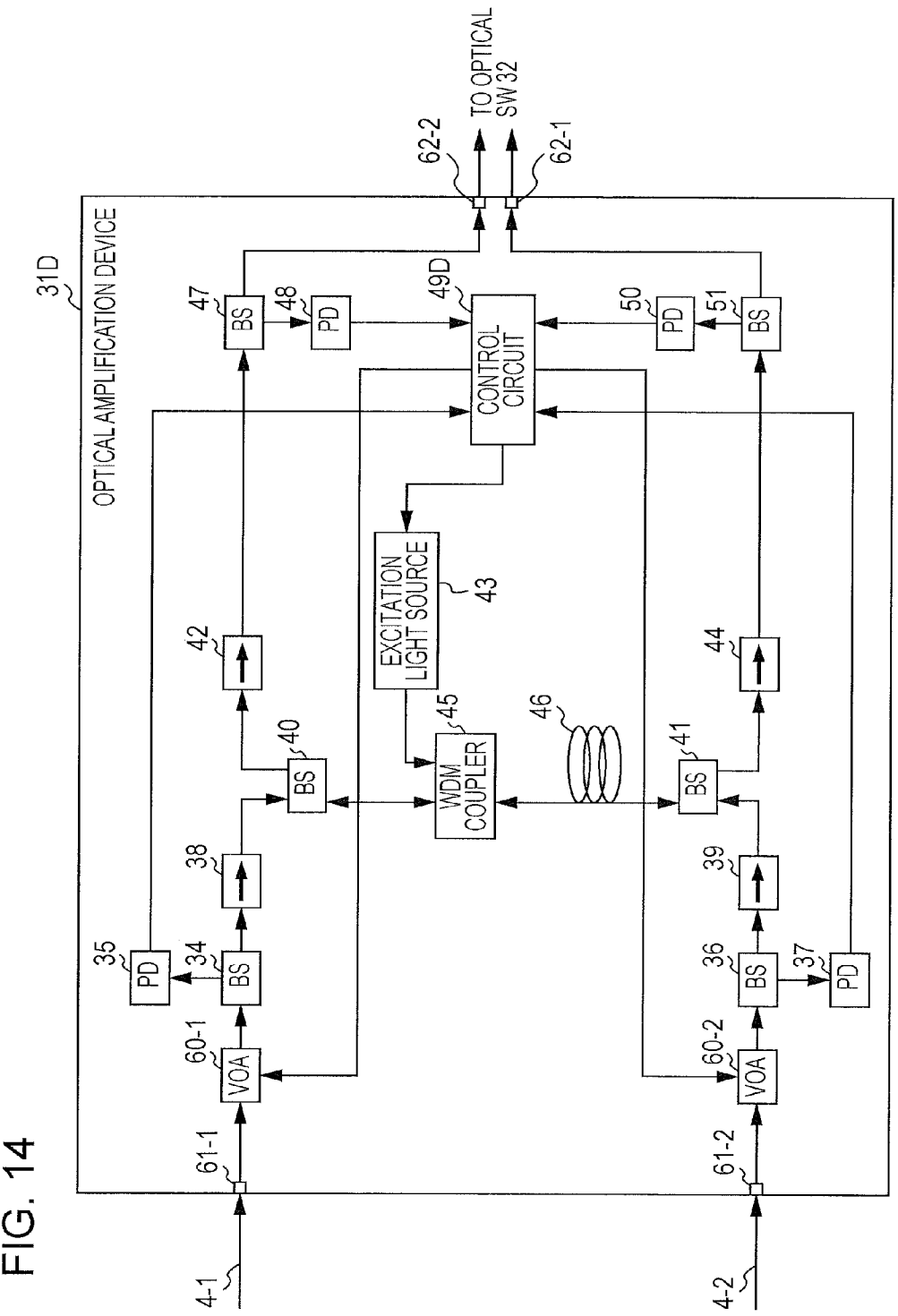
FIG. 14 illustrates an example of the configuration of an optical amplification device according to a fourth modification.

Therefore, as illustrated in FIG. 14 as an example, an optical amplification device 31D according to this modification has input ports 61-1 and 61-2, the VOAs 60-1 and 60-2, BSs 34 and 36, PDs 35 and 37, optical isolators 38 and 39, BSs 40 and 41, and a WDM coupler 45. The optical amplification device 31D also has, for example, an optical amplifier 46, optical isolators 42 and 44, BSs 47 and 51, PDs 48 and 50, a control circuit 49D, an excitation light source 43, and output ports 62-1 and 62-2.

Components illustrated in FIG. 14 having the same reference numerals as those used for the components illustrated in FIG. 8 have the same functions as the components illustrated in FIG. 8, and therefore description thereof is omitted. FIG. 14 illustrates an example obtained by arranging the first VOA 60-1 between the input port 61-1 and the BS 34 and the second VOA 60-2 between the input port 61-2 and the BS 34 in the optical amplification device 31 illustrated in FIG. 8. The optical amplification devices 31 illustrated in FIGS. 17 and 19, the optical amplification devices 31A illustrated in FIGS. 10, 18, and 20, the optical amplification device 31B illustrated in FIG. 12, and the optical amplification device 31C illustrated in FIG. 13 may be configured by making the same arrangement.

Figure 22:
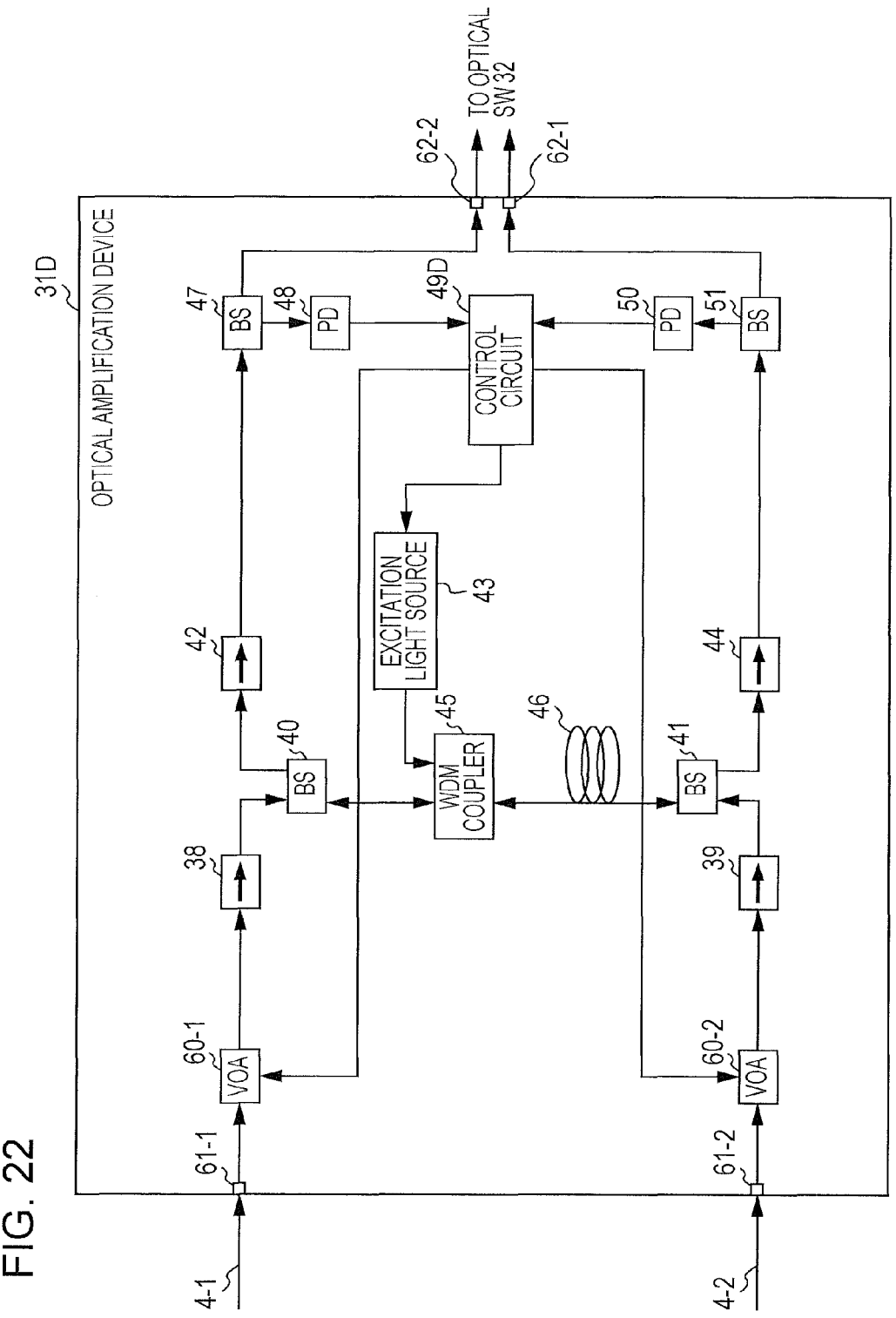
FIG. 22 illustrates another example of the configuration of the optical amplification device according to the fourth modification.

Furthermore, occurrence of failures in a work line 4-1 and a protection line 4-2 may be judged on the basis of results of detection performed by the PDs 50 and 48, respectively. In this case, in the optical amplification device 31D, the BS 34, the PD 35, the BS 36, and the PD 37 may be omitted as illustrated in FIG. 22.

The VOA (first variable optical attenuator) 60-1 provides an amount of attenuation controlled by the control circuit 49D to a work light signal input from the work line 4-1. The VOA (second variable optical attenuator) 60-2 provides an amount of attenuation controlled by the control circuit 49D to a protection light signal input from the protection line 4-2.

The control circuit 49D has the same functions as the control circuit 49 and has a function of controlling the amounts of attenuation of the VOAs 60-1 and 60-2 on the basis of results of detection performed by the PDs 35 and 37.

Figure 15:
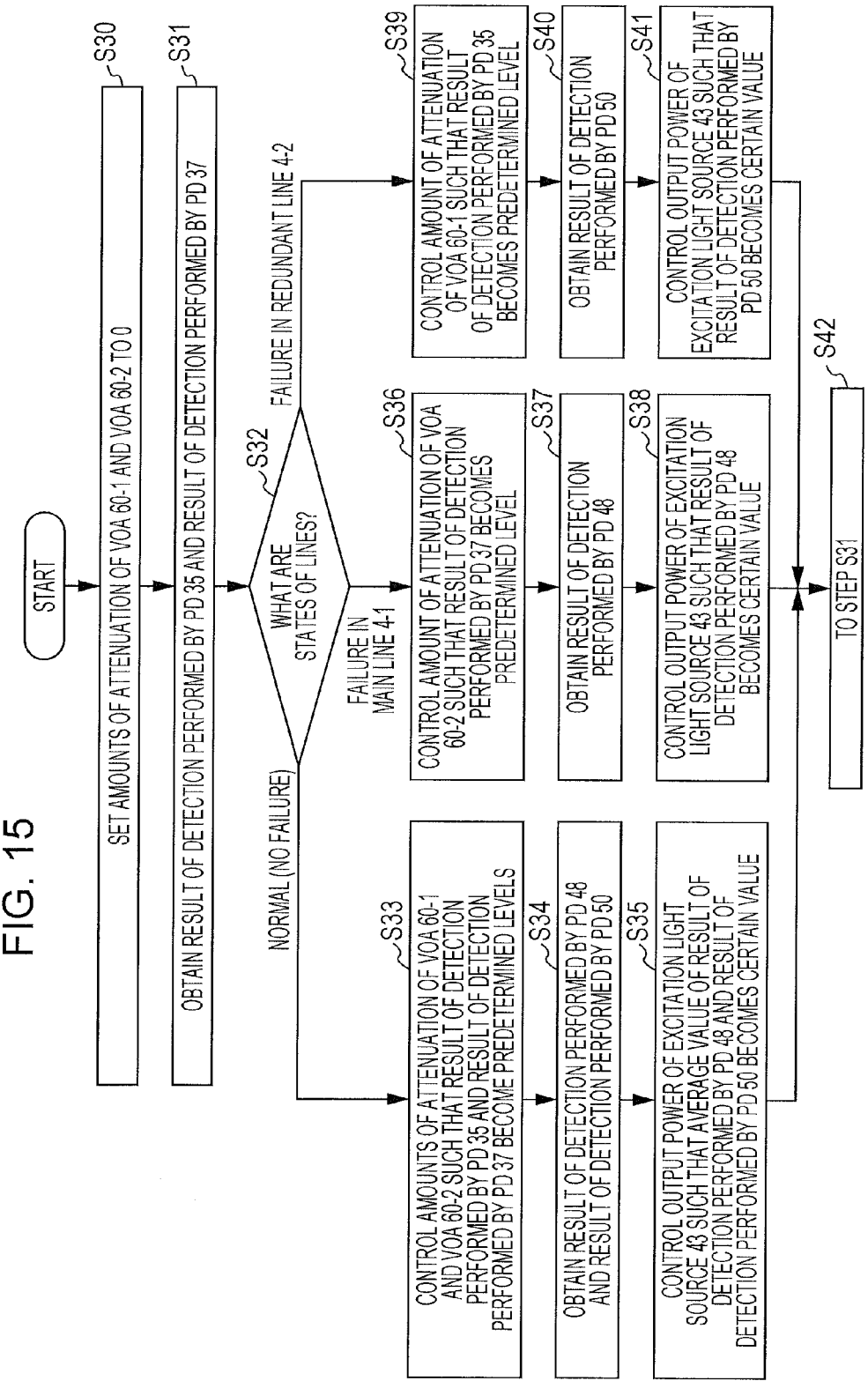
FIG. 15 illustrates an example of operations performed by the optical amplification device illustrated in FIG. 14.

FIG. 15 illustrates an example of operations performed by the control circuit 49D.

As illustrated in FIG. 15, first, the control circuit 49D sets the amounts of attenuation of the VOAs 60-1 and 60-2 to 0 (operation S30).

Next, the control circuit 49D obtains the level of the work light signal detected by the PD 35 and the level of the protection light signal detected by the PD 37 (operation S31).

The control circuit 49D makes judgments as to occurrence of failures in the work line 4-1 and the protection line 4-2 on the basis of the results of the detection performed by the PDs 35 and 37, respectively (operation S32).

If it is judged that no failure has occurred in both the work line 4-1 and the protection line 4-2, that is, if both the work line 4-1 and the protection line 4-2 are normal (route "normal (no failure)" in operation S32), the control circuit 49D controls the amounts of attenuation of the VOAs 60-1 and 60-2 provided to the light signals such that the level of the work light signal detected by the PD 35 and the level of the protection light signal detected by the PD 37 become a certain level (operation S33).

Next, the control circuit 49D obtains the level of a protection light signal after amplification detected by the PD 48 and the level of a work light signal after amplification detected by the PD 50 (operation S34).

The control circuit 49D then calculates the average value of the results of the detection performed by the PDs 48 and 50, and controls the optical power of the excitation light output from the excitation light source 43 such that the calculated average value becomes a given value (operation S35). Thereafter, processing performed by the control circuit 49D proceeds to operation S31 (operation S42).

That is, in this case, the control circuit 49D performs the ALC on the optical amplifier 46 such that the average value of the level of the work light signal after the amplification and the level of the protection light signal after the amplification become the given value. Although the control circuit 49D performs the ALC on the basis of the average value of the level of the work light signal after the amplification and the level of the protection light signal after the amplification in the example illustrated in FIG. 15, the control circuit 49D may, for example, perform the ALC on the basis of a weighted average obtained by weighting either the level of the work light signal after the amplification or the level of the protection light signal after the amplification.

In this case, in view of an optical surge that may occur in the optical amplifier 46 upon a switching operation of the optical SW 32, it is desirable to determine a weighting coefficient of the level of the protection light signal after the amplification to be larger than a weighting coefficient of the level of the work light signal after the amplification.

On the other hand, if it is judged that a failure has occurred in the work line 4-1 (route "failure in work line 4-1" in operation S32), the control circuit 49D controls the amount of attenuation of the VOA 60-2 provided to the protection light signal such that the level of the protection light signal detected by the PD 37 becomes a certain level (operation S36). At this time, the control circuit 49D may control and stop the operation of the VOA 60-1.

Next, the control circuit 49D obtains the level of the protection light signal after the amplification detected by the PD 48 (operation S37).

The control circuit 49D then controls the optical power of the excitation light output from the excitation light source 43 such that the result of the detection performed by the PD 48 becomes a given value (operation S38). Thereafter, the processing performed by the control circuit 49D proceeds to operation S31 (operation S42).

That is, in this case, the control circuit 49D performs the ALC on the optical amplifier 46 such that the level of the protection light signal after the amplification becomes the given value.

If it is judged that a failure has occurred in the protection line 4-2 (route "failure in protection line 4-2" in operation S32), the control circuit 49D controls the amount of attenuation of the VOA 60-1 provided to the work light signal such that the level of the work light signal detected by the PD 35 becomes a certain level (operation S39). At this time, the control circuit 49D may control and stop the operation of the VOA 60-2.

Next, the control circuit 49D obtains the level of the work light signal after the amplification detected by the PD 50 (operation S40).

The control circuit 49D then controls the optical power of the excitation light output from the excitation light source 43 such that the result of the detection performed by the PD 50 becomes a given value (operation S41). Thereafter, the processing performed by the control circuit 49D proceeds to operation S31 (operation S42).

That is, in this case, the control circuit 49D performs the ALC on the optical amplifier 46 such that the level of the work light signal after the amplification becomes the given value. Although not illustrated in FIG. 15, if failures occur in both the work line 4-1 and the protection line 4-2, the control circuit 49D may control the level of the optical power of the excitation light to achieve a given level and wait until either the work line 4-1 or the protection line 4-2 recovers from the corresponding failure.

According to this modification, the same effects as those according to the embodiment may be obtained. In addition, when the work line 4-1 and the protection line 4-2 are normal, the level of the work light signal input from the work line 4-1 and the level of the protection light signal input from the protection line 4-2 may be set to a certain level, thereby further stabilizing the ALC operation.

[7] Others

The configurations and the functions of the above-described optical transmitter station 2, optical receiver station 3, and optical amplification devices 31, 31A, 31B, 31C, and 31D may be appropriately selected and combined. That is, in order to realize the above-described functions according to the embodiment, the above-described configurations and functions may be appropriately selected and combined.

Although the embodiment and the modifications have been described while taking the optical receiver station 3 used in a WDM transmission system as an example, the embodiment and the modifications may be appropriately modified and adopted in an optical transmission system that transmits and receives light signals having a single wavelength, an optical transmission system that includes an optical relay station between the optical transmitter station 2 and the optical receiver station 3, an OADM system, and the like.

Although the optical SW 32 switches the connection to the optical amplification device 31, 31A, 31B, 31C, or 31D in accordance with occurrence of failures in the lines in the above-described embodiment and modifications, the switching operation may be controlled by the control circuit 49, 49A, or 49D.

When occurrence of a failure has been detected in at least either the work line 4-1 or the protection line 4-2, the control circuit 49, 49A, or 49D may generate an alarm signal indicating the occurrence of a failure and transmit the alarm signal to the optical transmitter station 2.

Figure 16:
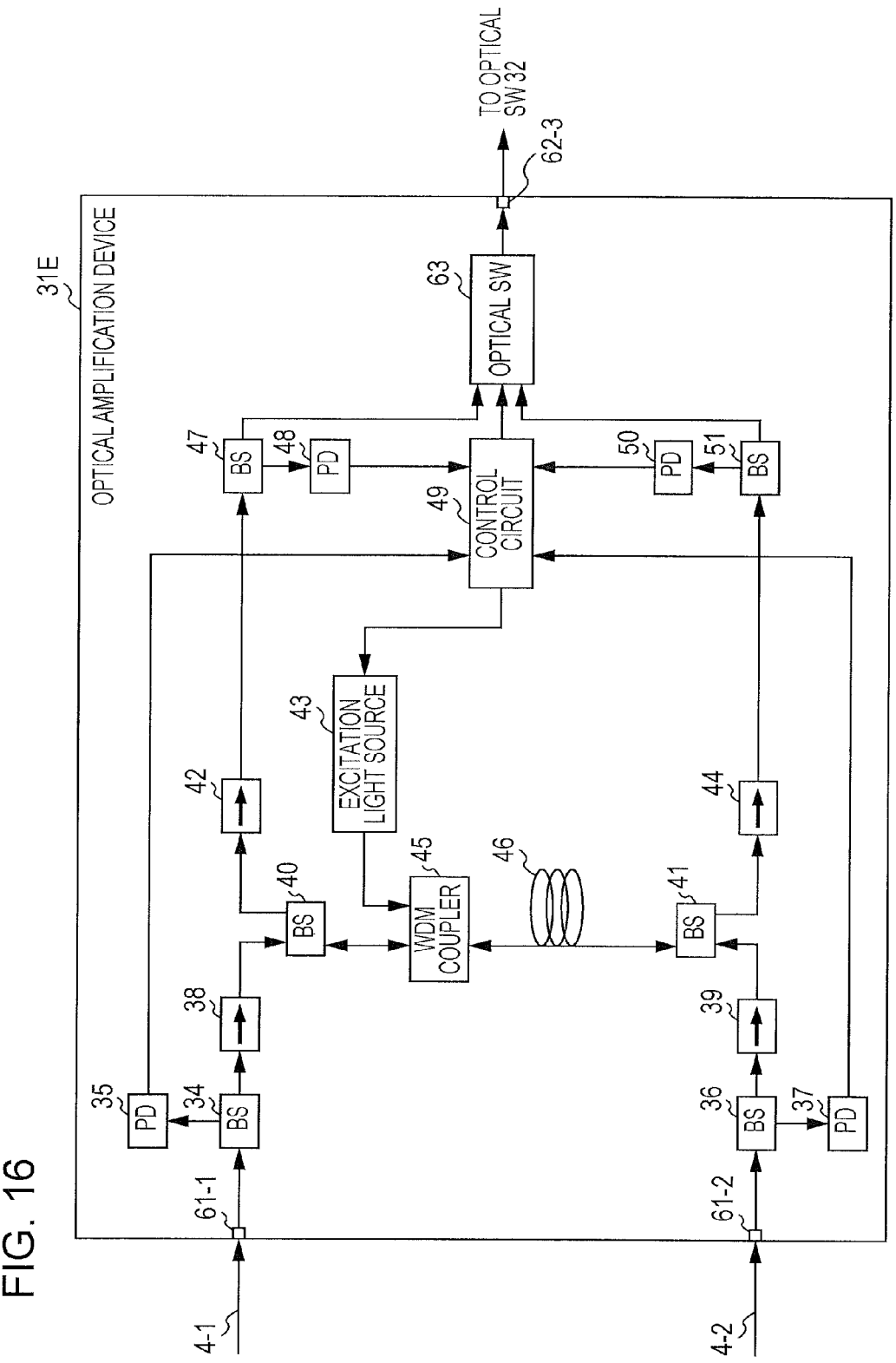
FIG. 16 illustrates another example of the configuration of the optical amplification device.

Furthermore, as illustrated in FIG. 16, an optical amplification device 31E may be configured by including an optical SW 63 that selects either a work light signal after amplification or a protection light signal after amplification in accordance with occurrence of failures in the work line 4-1 and the protection line 4-2. Components illustrated in FIG. 16 having the same reference numerals as those used for the components illustrated in FIG. 8 have the same functions as the components illustrated in FIG. 8, and therefore description thereof is omitted. FIG. 16 illustrates an example obtained by arranging the optical SW 63 in a subsequent stage of the BSs 47 and 51 of the optical amplification device 31 illustrated in FIG. 8. The optical amplification devices 31 illustrated in FIGS. 17 and 19, the optical amplification devices 31A illustrated in FIGS. 10, 18, and 20, the optical amplification device 31B illustrated in FIG. 12, the optical amplification device 31C illustrated in FIG. 13, and the optical amplification device 31D illustrated in FIG. 14 may be configured by making the same arrangement.

In this case, the control circuit 49 may control the switching operation performed by the optical SW 63 on the basis of results of detection of the work light signal and the protection light signal, and the optical SW 32 may be omitted from the optical receiver station 3 including the optical amplification device 31E.

In doing so, the switching operation may be performed within the optical amplification device 31E after occurrence of a failure. Therefore, it is possible to further simplify the configuration of the optical receiver station 3 and further reduce the size and the manufacturing cost of the optical receiver station 3.

The optical amplification devices 31, 31A, 31B, 31C, 31D, and 31E described in the above embodiment and modifications may be configured by cards or boards mounted in the optical receiver station 3.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An optical amplification apparatus, comprising:
an optical amplification medium configured to receive a first light signal input from a first end of the optical amplification medium and a second light signal input from a second end of the optical amplification medium in opposite directions, the first and second light signals being divided from a light signal;
an excitation light source configured to supply excitation light to the optical amplification medium through a multiplexer;
a monitor configured to monitor the first light signal input to the optical amplification medium with respect to a first threshold value and second light signal input to the optical amplification medium with respect to a second threshold value, respectively and to output monitor signals respectively; and
a controller configured to determine a failure in the first light signal if the first light signal is less than the first threshold value and determine a failure in the second light signal if the second light signal is less than the second threshold value and control the excitation light source in accordance with the determinations.

2. The optical amplification apparatus according to claim 1, further comprising:
first and second ports configured to output the first and second light signals, respectively, that have been amplified; and
circulators operable to couple both the ends of the optical amplification medium with the first and second ports, respectively, using the first and second light signals.

3. The optical amplification apparatus according to claim 1, further comprising:
splitters operable to couple both the ends of the optical amplification medium with the first and second ports, respectively, using the first and second light signals.

4. An optical amplification apparatus, comprising:
a first input port that receives a work light signal transmitted through a first optical transmission path;
a second input port that receives a protection light signal corresponding to the work light signal, transmitted through a second transmission path;
an optical amplifier that amplifies the work light signal input to a first input/output unit from the first input port and the protection light signal input to a second input/output unit from the second input port in a direction different from a direction of the work light signal and that outputs a work light signal after amplification from the second input/output unit and a protection light signal after amplification from the first input/output unit;
a first output port that outputs the work light signal after the amplification output from the second input/output unit;
a second output port that outputs the protection light signal after the amplification output from the first input/output unit;
an excitation light source that supplies excitation light to the optical amplifier for the amplification from at least either the first input/output unit or the second input/output unit; and
a controller that determines a failure in the work light signal if the work light signal is less than a first threshold value and determines a failure in the protection light signal if the protection light signal is less than a second threshold value and controls the excitation light, based on the determinations.

5. The optical amplification apparatus according to claim 4, further comprising:
a first detector that divides the work light signal after the amplification output from the second input/output unit and that detects a level of the divided work light signal after the amplification; and
a second detector that divides the protection light signal after the amplification output from the first input/output unit and that detects a level of the divided protection light signal after the amplification,
wherein the controller controls the excitation light, based on a result of the detection performed by the first detector and a result of the detection performed by the second detector.

6. The optical amplification apparatus according to claim 5,
wherein, when the first detector has detected a failure in the work light signal, the controller controls the excitation light, based on the result of the detection performed by the second detector.

7. The optical amplification apparatus according to claim 4, further comprising:
a combined signals detector that divides the work light signal after the amplification output from the second input/output unit and the protection light signal after the amplification output from the first input/output unit, that combines the divided light signal after the amplification and the divided protection light signal after the amplification, and that detects a level of the combined light signals, wherein the controller controls the excitation light, based on a result of the detection performed by the combined signals detector.

8. The optical amplification apparatus according to claim 5, further comprising:
a third detector that divides the work light signal input from the first input port and that detects a level of the divided work light signal; and
a fourth detector that divides the protection light signal input from the second input port and that detects a level of the divided protection light signal,
wherein the controller uses a result of the detection performed by the third detector and a result of the detection performed by the fourth detector to control the excitation light.

9. The optical amplification apparatus according to claim 4,
wherein the optical amplifier includes
a first rare-earth doped optical fiber that is connected to the first input/output unit,
a second rare-earth doped optical fiber that is connected in cascade to the first rare-earth doped optical fiber and that is connected to the second input/output unit, and
a gain-flat filter that is located between the first rare-earth doped optical fiber and the second rare-earth doped optical fiber and that flattens a wavelength dependence characteristic of amplification gain of the optical amplifier, and
wherein the excitation light source supplies excitation light from both the first input/output unit and the second input/output unit.

10. The optical amplification apparatus according to claim 9,
wherein the gain-flat filter has a filter characteristic that blocks a wavelength range of the excitation light supplied from the excitation light source.

11. The optical amplification apparatus according to claim 4, further comprising:
a first optical circulator that inputs, to the first input/output unit, the work light signal input through the first optical transmission path and that outputs, to the second output port, the protection light signal after the amplification output from the first input/output unit; and
a second optical circulator that inputs, to the second input/output unit, the protection light signal input through the second optical transmission path and that outputs, to the first output port, the work light signal after the amplification output from the second input/output unit.

12. The optical amplification apparatus according to claim 4, further comprising:
a first variable optical attenuator that attenuates the work light signal input through the first optical transmission path; and
a second variable optical attenuator that attenuates the protection light signal input through the second optical transmission path,
wherein the controller controls amounts of attenuation of the first variable optical attenuator and the second variable optical attenuator on the basis of a level of the work light signal and a level of the protection light signal, respectively.

13. A method of controlling an optical amplification apparatus, comprising:
an optical amplifier that amplifies a light signal input through a first optical transmission path to a first input/output unit and a protection light signal corresponding to the light signal, input through a second optical transmission path to a second input/output unit in a direction different from a direction of the light signal and that outputs a light signal after amplification from the second input/output unit and a protection light signal after amplification from the first input/output unit;
an excitation light source that supplies excitation light to the optical amplifier for the amplification from at least either the first input/output unit or the second input/output unit; and
a controller that controls the excitation light,
wherein the controller determines a failure in the light signal if the light signal is less than a first threshold value and determines a failure in the protection light signal if the protection light signal is less than a second threshold value,
wherein the controller controls the excitation light on the basis of the determinations, and
wherein the excitation light source supplies the excitation light controlled by the controller to the optical amplifier.

14. The method for controlling an optical amplification apparatus according to claim 13,
wherein, when a level of the light signal is equal to or higher than the first threshold value and a level of the protection light signal is equal to or higher than the second threshold value, the controller controls the excitation light such that an average value of a level of the light signal after the amplification and a level of the protection light signal after the amplification becomes a given value, and
wherein, when the level of the light signal is lower than the first threshold value and the level of the protection light signal is equal to or higher than the second threshold value, the controller controls the excitation light such that the level of the protection light signal after the amplification becomes the given value.

15. The method for controlling an optical amplification apparatus according to claim 14,
wherein, when the level of the protection light signal is lower than the second threshold value and the level of the light signal is equal to or higher than the first threshold value, the controller controls the excitation light such that the level of the protection light signal after the amplification becomes the given value.

16. The method for controlling an optical amplification apparatus according to claim 13,
wherein, when a level of the light signal is equal to or higher than a first threshold value and a level of the protection light signal is equal to or higher than a second threshold value, the controller controls the excitation light such that half a level of light signals obtained by combining the light signal after the amplification and the protection light signal after the amplification becomes a given value, and
wherein, when the level of the light signal is lower than the first threshold value and the level of the protection light signal is equal to or higher than the second threshold value, the controller controls the excitation light such that the level of the combined light signals becomes the given value.

17. The method for controlling an optical amplification apparatus according to claim 16,
wherein, when the level of the protection light signal is lower than the second threshold value and the level of the light signal is equal to or higher than the first threshold value, the controller controls the excitation light such that the level of the combined light signals becomes the given value.

* * * * *